US010191921B1

United States Patent
Can et al.

(10) Patent No.: US 10,191,921 B1
(45) Date of Patent: Jan. 29, 2019

(54) SYSTEM FOR EXPANDING IMAGE SEARCH USING ATTRIBUTES AND ASSOCIATIONS

(71) Applicant: SAS Institute Inc., Cary, NC (US)

(72) Inventors: Ethem F. Can, Cary, NC (US); Richard Welland Crowell, Cary, NC (US); Samuel Paul Leeman-Munk, Cary, NC (US); Jared Peterson, Cary, NC (US); Saratendu Sethi, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 0 days.

(21) Appl. No.: 15/944,163

(22) Filed: Apr. 3, 2018

(51) Int. Cl.
*G06F 17/30* (2006.01)
*G06N 3/08* (2006.01)

(52) U.S. Cl.
CPC .. *G06F 17/30268* (2013.01); *G06F 17/30256* (2013.01); *G06F 17/30401* (2013.01); *G06N 3/08* (2013.01)

(58) Field of Classification Search
None
See application file for complete search history.

(56) References Cited

U.S. PATENT DOCUMENTS

| 7,565,139 B2 | 7/2009 | Neven, Sr. et al. |
| 7,660,793 B2 * | 2/2010 | Indeck .............. G06F 17/30595 707/770 |
| 8,782,072 B2 | 7/2014 | Bennett |
| 2002/0051576 A1 | 5/2002 | Choi et al. |
| 2009/0006344 A1 * | 1/2009 | Platt ....................... G06F 17/276 |
| 2009/0287678 A1 * | 11/2009 | Brown .............. G06F 17/30654 |
| 2010/0017389 A1 | 1/2010 | Ogunbona et al. |
| 2018/0068023 A1 * | 3/2018 | Douze ............... G06F 17/30867 |

(Continued)

FOREIGN PATENT DOCUMENTS

| WO | WO0002111 A2 | 1/2000 |
| WO | WO0002111 A3 | 4/2000 |
| WO | WO2007137352 | 12/2007 |

(Continued)

OTHER PUBLICATIONS

SAS Institute Inc. 2017. SAS® Visual Data Mining and Machine Learning 8.1: Data Mining and Machine Learning Procedures. Cary, NC: SAS Institute Inc., Mar. 2017.

(Continued)

*Primary Examiner* — Wilson Lee
(74) *Attorney, Agent, or Firm* — Bell & Manning, LLC

(57) ABSTRACT

A system provides image search results based on a query that includes an attribute or an association and a concept identifier. The query is input into a trained query model to define a search syntax for the query. The search syntax is submitted to an expanded annotated image database that includes a concept image of a concept identified by the concept identifier with a plurality of attributes associated with the concept and a plurality of associations associated with the concept. A query result is received based on matching the defined search syntax to one or more of the attributes or one or more of the associations. The query result includes the concept image of the concept associated with the matched one or more of the attributes or one or more of the associations. The concept image included in the received query result is presented in a display.

30 Claims, 22 Drawing Sheets

(56) References Cited

U.S. PATENT DOCUMENTS

2018/0075135 A1* 3/2018 Dole ................. G06F 17/30684
2018/0075366 A1* 3/2018 Dole ................. G06F 17/30684

FOREIGN PATENT DOCUMENTS

WO  WO2011054002 A2  5/2011
WO  WO2011054002 A3  10/2011

OTHER PUBLICATIONS

Karpathy et al., Deep Visual-Semantic Alignments for Generating Image Descriptions, CVPR2015 paper (2015).
Pham et al., Dropout improves Recurrent Neural Networks for Handwriting Recognition, arXiv:1312.4569v2, Mar. 10, 2014.
Mikolov et al., Efficient Estimation of Word Representations in Vector Space, arXiv:1301.3781v3, Sep. 7, 2013.
Wu et al., Google's Neural Machine Translation System: Bridging the Gap between Human and Machine Translation, arXiv:1609.08144v2, Oct. 8, 2016.
Datta et al., Image Retrieval: Ideas, Influences, and Trends of the New Age—Addendum, Mar. 13, 2007.
Wang et al., Part-of-Speech Tagging with Bidirectional Long Short-Term Memory Recurrent Neural Network, arXiv:1510.06168v1, Oct. 21, 2015.
Vinyals et al., Show and Tell: A Neural Image Caption Generator, CVPR2015 paper (2015).

* cited by examiner

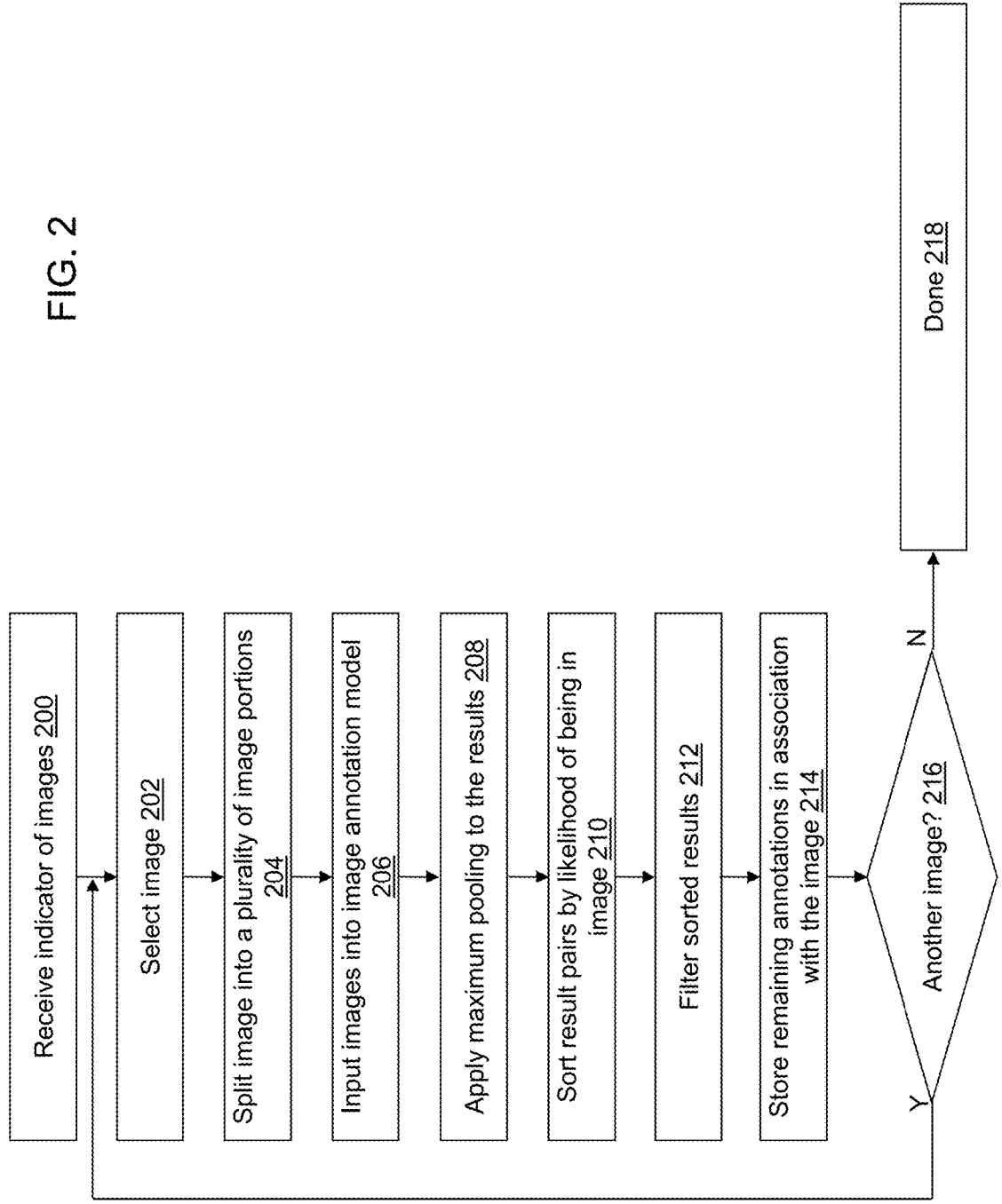

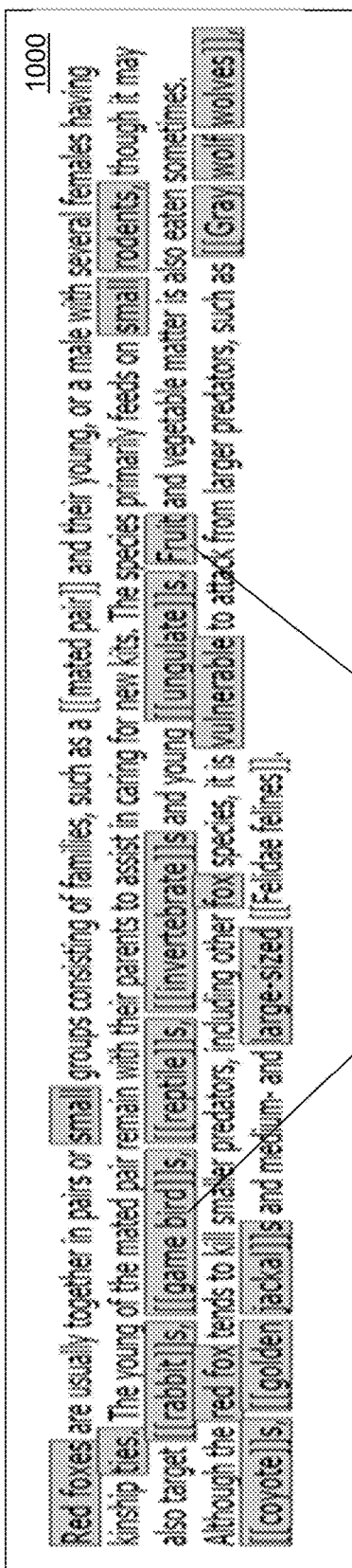
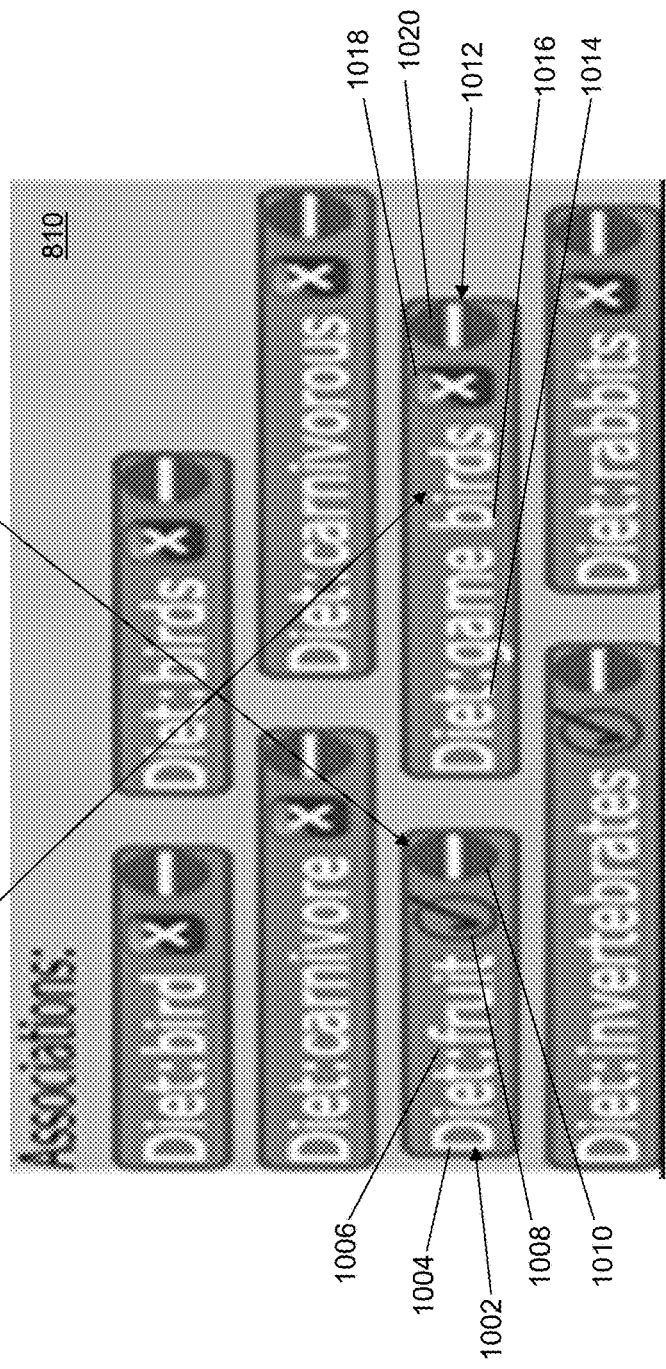
FIG. 10

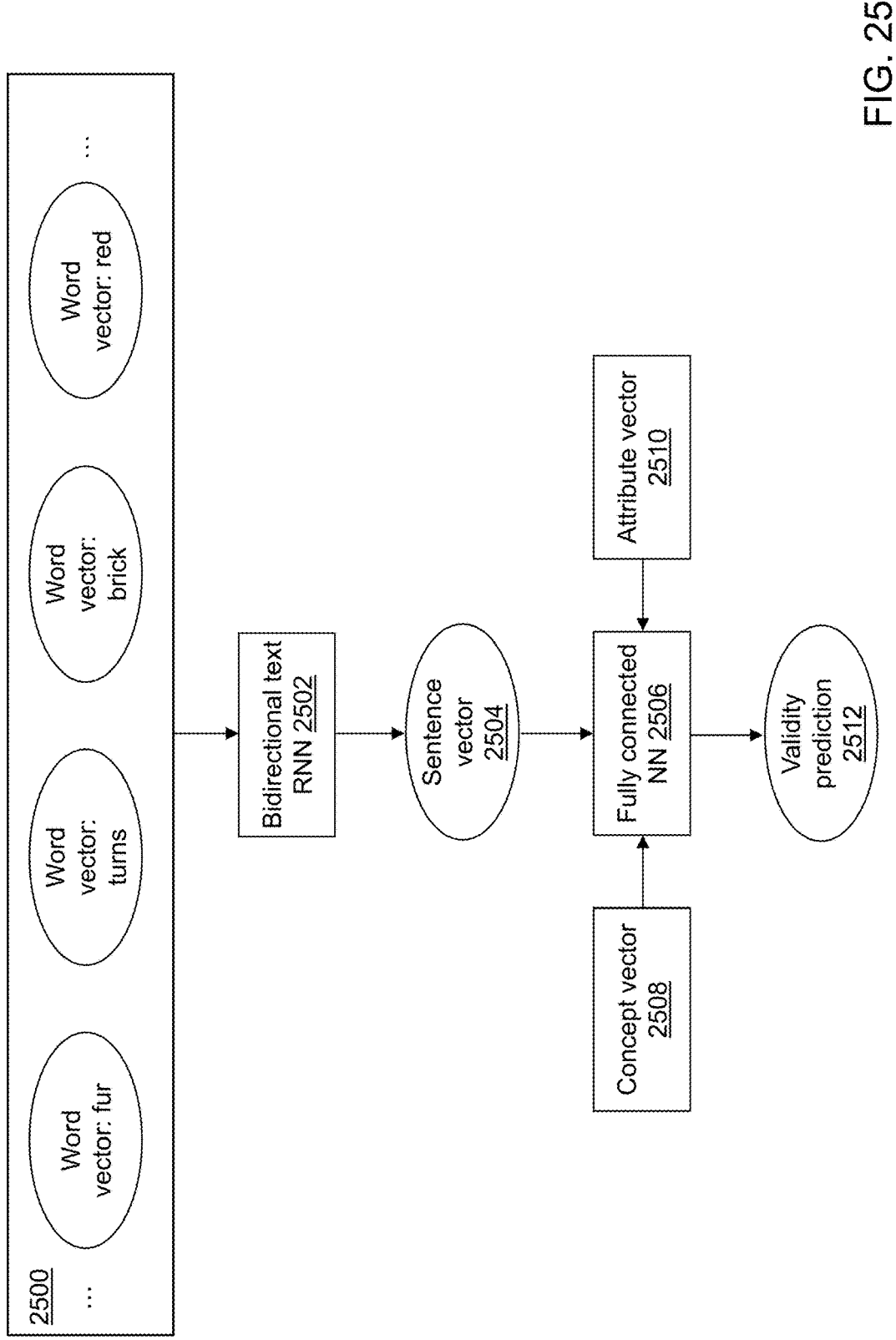

SYSTEM FOR EXPANDING IMAGE SEARCH USING ATTRIBUTES AND ASSOCIATIONS

SUMMARY

In another example embodiment, a computing device is provided. The computing device includes, but is not limited to, a processor and a non-transitory computer-readable medium operably coupled to the processor. The computer-readable medium has instructions stored thereon that, when executed by the computing device, cause the computing device to identify image search results based on a query that includes an attribute or an association. A query is received. The query is a request to identify an image relevant to the query and includes a concept identifier and an attribute or an association. The received query is input into a trained query model to define a search syntax for the received query. The defined search syntax is submitted to an expanded annotated image database. The expanded annotated image database includes a concept image of a concept identified by the concept identifier with a plurality of attributes associated with the concept and a plurality of associations associated with the concept. A query result of the received query is received based on matching the defined search syntax to one or more of the plurality of attributes or one or more of the plurality of associations. The query result includes the concept image of the concept associated with the matched one or more of the plurality of attributes or one or more of the plurality of associations. The concept image included in the received query result is presented in a display.

In an example embodiment, a non-transitory computer-readable medium is provided having stored thereon computer-readable instructions that, when executed by a computing device, cause the computing device to identify image search results based on a query that includes an attribute or an association.

In yet another example embodiment, a method of identifying image search results based on a query that includes an attribute or an association is provided.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

FIG. 2 depicts a flow diagram illustrating examples of operations performed by the data processing device of FIG. 1 to create an annotated image database in accordance with an illustrative embodiment.

FIG. 10 shows a second zoomed portion of the user interface of FIG. 8 in accordance with an illustrative embodiment.

FIG. 25 depicts a block diagram of an attribute validation model in accordance with an illustrative embodiment.

DETAILED DESCRIPTION

Figure 1:
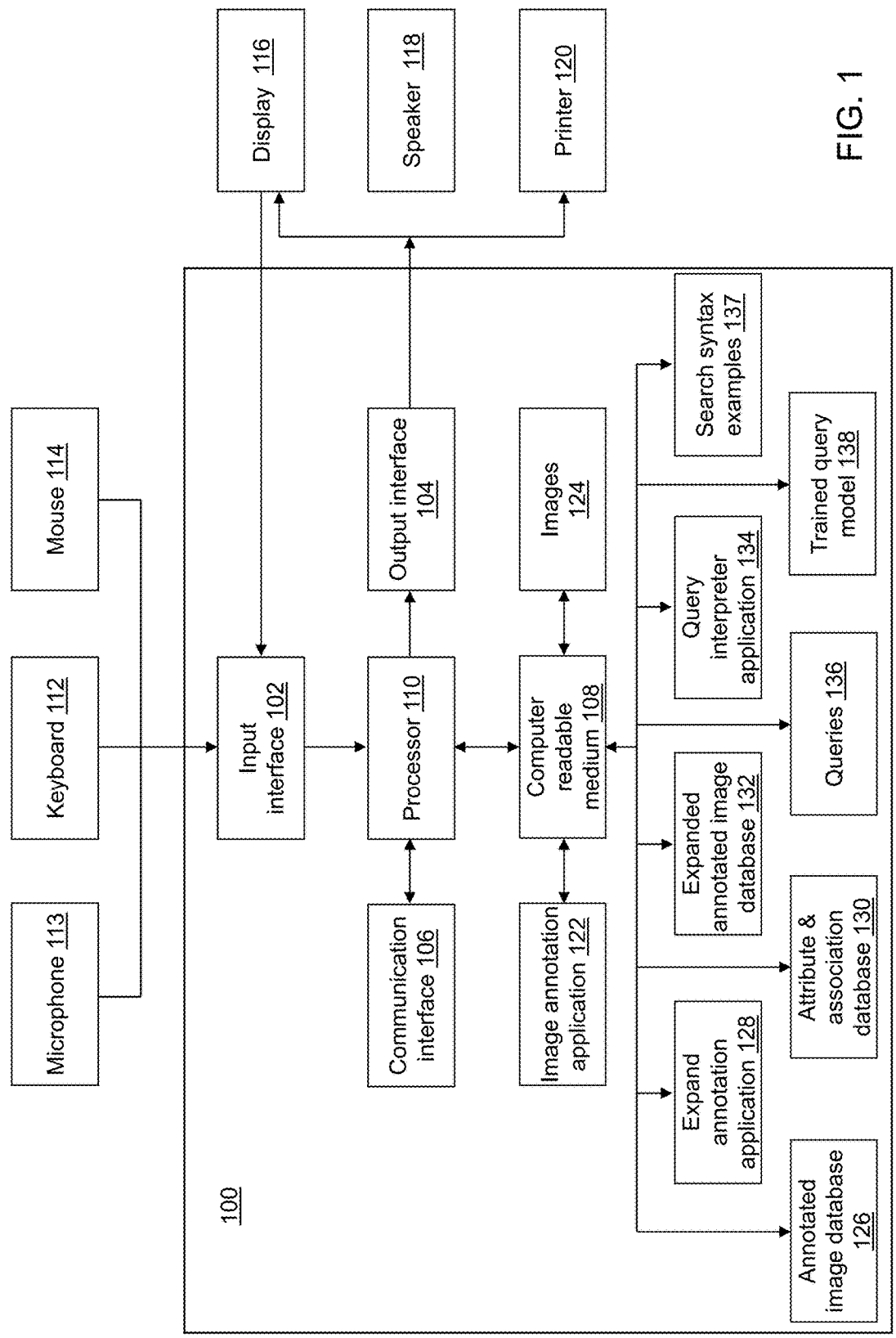
FIG. 1 depicts a block diagram of a data processing device in accordance with an illustrative embodiment.

Referring to FIG. 1, a block diagram of a data processing device 100 is shown in accordance with an illustrative embodiment. Data processing device 100 may include an input interface 102, an output interface 104, a communication interface 106, a non-transitory computer-readable medium 108, a processor 110, an image annotation application 122, images 124, an annotated image database 126, an expand annotation application 128, an attribute and association (A&A) database 130, an expanded annotated image database 132, a query interpreter application 134, queries 136, search syntax examples 137, and a trained query model 138. Fewer, different, and/or additional components may be incorporated into data processing device 100.

Input interface 102 provides an interface for receiving information from the user or another device for entry into data processing device 100 as understood by those skilled in the art. Input interface 102 may interface with various input technologies including, but not limited to, a keyboard 112, a microphone 113, a mouse 114, a display 116, a track ball, a keypad, one or more buttons, etc. to allow the user to enter information into data processing device 100 or to make selections presented in a user interface displayed on display 116. The same interface may support both input interface 102 and output interface 104. For example, display 116 comprising a touch screen provides a mechanism for user input and for presentation of output to the user. Data processing device 100 may have one or more input interfaces that use the same or a different input interface technology. The input interface technology further may be accessible by data processing device 100 through communication interface 106.

Output interface 104 provides an interface for outputting information for review by a user of data processing device 100 and/or for use by another application or device. For example, output interface 104 may interface with various output technologies including, but not limited to, display 116, a speaker 118, a printer 120, etc. Data processing device 100 may have one or more output interfaces that use the same or a different output interface technology. The output interface technology further may be accessible by data processing device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Data processing device 100 may have one or more communication interfaces that use the same or a different communication interface technology. For example, data processing device 100 may support communication using an Ethernet port, a Bluetooth antenna, a telephone jack, a USB port, etc. Data and messages may be transferred between data processing device 100 and another computing device using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. data processing device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Data processing device 100 also may have one or more drives that support the loading of a memory media such as a CD, DVD, an external hard drive, etc. One or more external hard drives further may be connected to data processing device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Data processing device 100 may include a plurality of processors that use the same or a different processing technology.

Image annotation application 122 performs operations associated with creating annotated image database 126 from images 124 that may be stored locally and/or on a distributed computing system connected to data processing device 100 through communication interface 106 or output interface 104. The operations may be implemented using hardware, firmware, software, or any combination of these methods. Referring to the example embodiment of FIG. 1, image annotation application 122 is implemented in software (comprised of computer-readable and/or computer-executable instructions) stored in computer-readable medium 108 and accessible by processor 110 for execution of the instructions that embody the operations of image annotation application 122. Image annotation application 122 may be written using one or more programming languages, assembly languages, scripting languages, etc. Image annotation application 122 may be integrated with other analytic tools. As an example, image annotation application 122 may be part of an integrated data analytics software application and/or software architecture such as that offered by SAS Institute Inc. of Cary, N.C., USA. For example, image annotation application 122 may be integrated with one or more SAS software tools such as SAS® Enterprise Miner™, SAS® Factory Miner, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream processing (ESP) all of which are developed and provided by SAS Institute Inc. of Cary, N.C., USA. Data mining and data analytics is applicable in a wide variety of industries.

Image annotation application 122 may be implemented as a Web application. For example, image annotation application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Expand annotation application 128 performs operations associated with creating expanded annotated image database 132 from annotated image database 126 and A&A database 130 that may be stored locally and/or on the distributed computing system. The operations may be implemented using hardware, firmware, software, or any combination of these methods. Referring to the example embodiment of FIG. 1, expand annotation application 128 is implemented in software (comprised of computer-readable and/or computer-executable instructions) stored in computer-readable medium 108 and accessible by processor 110 for execution of the instructions that embody the operations of expand annotation application 128. Expand annotation application 128 may be written using one or more programming languages, assembly languages, scripting languages, etc. Expand annotation application 128 may be integrated with other analytic tools. As an example, expand annotation application 128 may be part of an integrated data analytics software application and/or software architecture such as that offered by SAS Institute Inc. of Cary, N.C., USA. For example, expand annotation application 128 may be integrated with one or more SAS software tools such as SAS® Enterprise Miner™ SAS® Factory Miner, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream processing (ESP). Expand annotation application 128 may be implemented as a Web application.

Query interpreter application 134 performs operations associated with creating trained query model 138 from queries 136 and A&A database 130 that may be stored locally and/or on the distributed computing system. The operations may be implemented using hardware, firmware, software, or any combination of these methods. Referring to the example embodiment of FIG. 1, query interpreter application 134 is implemented in software (comprised of computer-readable and/or computer-executable instructions) stored in computer-readable medium 108 and accessible by processor 110 for execution of the instructions that embody the operations of query interpreter application 134. Query interpreter application 134 may be written using one or more programming languages, assembly languages, scripting languages, etc. Query interpreter application 134 may be integrated with other analytic tools. As an example, query interpreter application 134 may be part of an integrated data analytics software application and/or software architecture such as that offered by SAS Institute Inc. of Cary, N.C., USA. For example, query interpreter application 134 may be integrated with one or more SAS software tools such as SAS® Enterprise Miner™, SAS® Factory Miner, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream processing (ESP). Query interpreter application 134 may be implemented as a Web application.

Images 124 may include image data captured by various image capture equipment including a camera, a video camera, a synthetic aperture radar, an infrared sensor, medical imaging equipment (i.e., computed tomography image, magnetic resonance image, x-ray image, ultrasound image, etc.), etc. Each image included in images 124 may be defined by a first number of pixels in a first direction and a second number of pixels in a second direction to define an array of pixels. A color scale (e.g. gray-scale, red-green blue scale) may be used to indicate a color value for each pixel in the array of pixels. Though typically two-dimensional, the array of pixels may have an additional dimension. Images 124 may include the image data itself or may include a list of references to separate image data that may be stored in separate image files.

Images 124 may be generated by and/or captured from a variety of sources of the same or different type. Images 124 may be received directly or indirectly from the source and may or may not be pre-processed in some manner. Images 124 may be organized using delimited fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Images 124 may be stored on computer-readable medium 108 and/or on one or more computer-readable media of the distributed computing system and accessed by or received by data processing device 100 using communication interface 106, input interface 102, and/or output interface 104. Images 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Images 124 may be captured at different time points periodically, intermittently, when an event occurs, etc. One or more columns of images 124 may include a time value and/or a date value.

Images 124 may be stored using various data structures as known to those skilled in the art including one or more files of a file system, a relational database, one or more tables of a system of tables, a structured query language database, etc. on data processing device 100 or on the distributed computing system that may be the same or different. Data processing device 100 may coordinate access to images 124 that is distributed across the distributed computing system that may include one or more computing devices. For example, images 124 may be stored in a cube distributed across a grid of computers as understood by a person of skill in the art. As another example, images 124 may be stored in a multi-node Hadoop® cluster. For instance, Apache™ Hadoop® is an open-source software framework for distributed computing supported by the Apache Software Foundation. As another example, images 124 may be stored in a cloud of computers and accessed using cloud computing technologies, as understood by a person of skill in the art. The SAS® LASR™ Analytic Server may be used as an analytic platform to enable multiple users to concurrently access data stored in images 124. The SAS® Viya™ open, cloud-ready, in-memory architecture also may be used as an analytic platform to enable multiple users to concurrently access data stored in images 124. Some systems may use SAS In-Memory Statistics for Hadoop® to read big data once and analyze it several times by persisting it in-memory for the entire session. Some systems may be of other types and configurations.

Referring to FIG. 2, example operations associated with image annotation application 122 are described. Additional, fewer, or different operations may be performed depending on the embodiment of image annotation application 122. The order of presentation of the operations of FIG. 2 is not intended to be limiting. Although some of the operational flows are presented in sequence, the various operations may be performed in various repetitions, concurrently (in parallel, for example, using threads and/or the distributed computing system), and/or in other orders than those that are illustrated. For example, a user may execute image annotation application 122, which causes presentation of a first user interface window, which may include a plurality of menus and selectors such as drop-down menus, buttons, text boxes, hyperlinks, etc. associated with image annotation application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by image annotation application 122. For example, instead of receiving input through a user interface, the input may be read from a file stored on computer-readable medium 108 and/or on the distributed computing system.

In an operation 200, a first indicator may be received that indicates images 124. The first indicator may indicate a location and a name of images 124. As an example, the first indicator may be received by image annotation application 122 after selection from a user interface window or after entry by a user into a user interface window. In an alternative embodiment, images 124 may not be selectable. For example, a most recently created dataset may be used automatically. For example, a grid, a cube, a cloud, a Hadoop® cluster, a relational database, a file system, etc. location may be used automatically as a location/name of images 124. As another example, images 124 may be streamed to data processing device 100.

In an operation 202, an image is selected from images 124.

Figure 5:
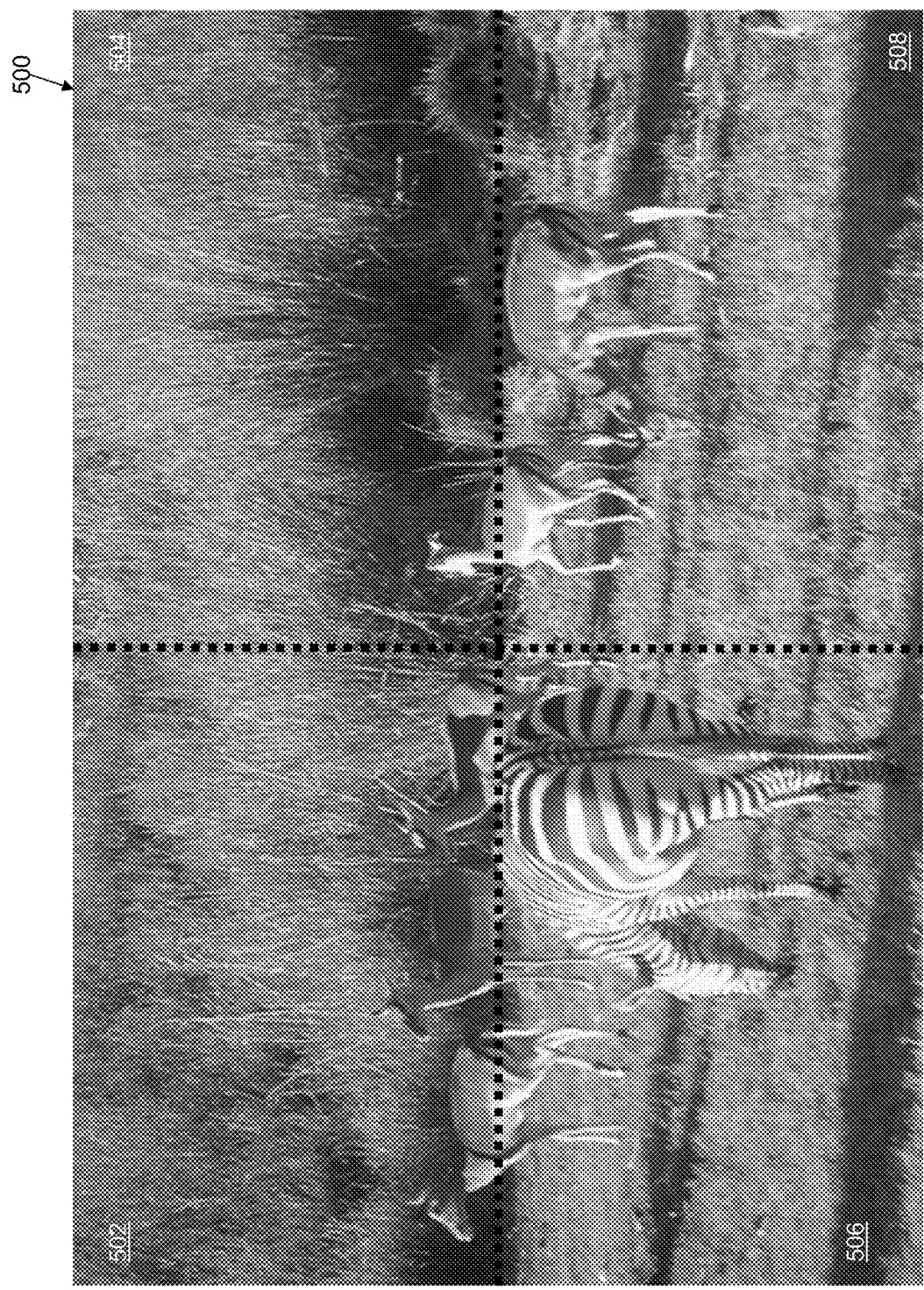
FIG. 5 shows an image for processing by the data processing device of FIG. 1 in accordance with an illustrative embodiment.

In an operation 204, the selected image is split into a plurality of image portions to increase an accuracy and a coverage of an annotation to be determined. Referring to FIG. 5, an illustrative image 500 is shown in accordance with an illustrative embodiment. Illustrative image 500 has been split into a first image 502, a second image 504, a third image 506, and a fourth image 508.

Referring again to FIG. 2, in an operation 206, the selected image and the plurality of image portions are input to an image annotation model to define a result set for each of the selected first image and the plurality of images. Based on the image split shown referring to FIG. 5, five result sets are defined with one for illustrative image 500 and one each for first image 502, second image 504, third image 506, and fourth image 508. Each result set may include a plurality of result pairs, where each result pair of the plurality of result pairs includes a probability value and an image label. An annotation may refer to the image label that captures information that describes a content of each image.

For illustration, the image annotation model may be a trained convolutional neural network mode. Image annotation is the problem of identifying one or more pre-defined image labels that represent one or more concepts in an image. Several different features including color consistency, multicolor contours, and patch-based silent features can be used to identify concepts in images as described in Datta, R., et al., *Image retrieval: Ideas, influences, and trends of the new age*, ACM Computing Surveys (Csur), 40(2), 5 (2008). Recent efforts using methods based on convolutional neural networks (CNN) produce better accuracies compared to their older counterparts as described in Karpathy, A., & Fei-Fei, L., *Deep visual-semantic alignments for generating image descriptions*, In Proceedings of the IEEE Conference on Computer Vision and Pattern Recognition, 3128-3137 (2015). The image annotation model may be a CNN-based model to annotate images.

In an operation 208, maximum pooling is applied to the defined result set for each of the selected first image and the plurality of images to define a single result set.

In an operation 210, the plurality of result pairs of the defined single result set are sorted based on the probability value that indicates a likelihood that a concept identified by the image label is included in the selected image.

In an operation 212, the sorted plurality of result pairs are filtered to remove weak associations. For example, the following function removes weak annotations:

```
def printTopKFiltered(annotations, classes, topK):
  probs=[ ]
  labels=[ ]
  iter=0
  for a in annotations:
     probs.append(a)
     labels.append(classes[iter])
     iter+=1
  a=zip(probs, labels)
  b=sorted(a, reverse=True)
  cc=b[:topK]
  resulting List=[ ]
  resultingList.append(b[0])
  last=b[0]
  for c in range(1,topK):
     if (last[0]−b[c][0])<b[c][0]:
        resultingList.append(b[c])
  return resultingList
```

The function above removes noisy annotations. For example, assuming the image label having the highest likelihood is 'fox' with a probability score of 0.98, the second highest image label is tar with a probability score of 0.1, and so on. A distance between tar and 'fox' is 0.98−0.1=0.88, which is greater than the probability value of tar itself ((last[0]−b[c][0])<b[c][0]). When this is true, the second highest image label and all image labels having a lower probability are removed.

For illustration, the top 10 annotations for the image in FIG. 5 are:

(0.96013553362196846, 'zebra'),
(0.84780626216656751, 'impala, *Aepyceros melampus*'),
(0.68723498919222659, 'gazelle'),
(0.065345734083995702, 'crane'),
(0.06183142278790052, 'hartebeest'),
(0.040279355712271751, 'lakeside, lakeshore'),
(0.037855165338310959, 'hay'),
(0.030416112905688842, 'American egret, great white heron, *Egretta albus*'),
(0.028327446447972884, 'prairie chicken, prairie grouse, prairie fowl'), (0.027990408428137128, 'hare')

Below are the annotations that remain after applying the filter function above:

(0.96013553362196846, 'zebra'),
(0.84780626216656751, 'impala, *Aepyceros melampus*'),
(0.68723498919222659, 'gazelle')

The weak annotations (with less significant likelihoods) are not stored in annotated image database 126. A constant annotation count for an image is not required, but only the annotations that have significant likelihoods are stored.

In an operation 214, the filtered result pairs of the defined single result set are stored in annotated image database 126 with an indicator of the selected first image.

In an operation 216, a determination is made concerning whether or not all of the images in images 124 have been processed and added to annotated image database 126. When all have been processed, processing continues in an operation 218. When all have not been processed, processing continues in operation 202.

In operation 218, creation of annotated image database 126 from images 124 is done.

Figure 3:
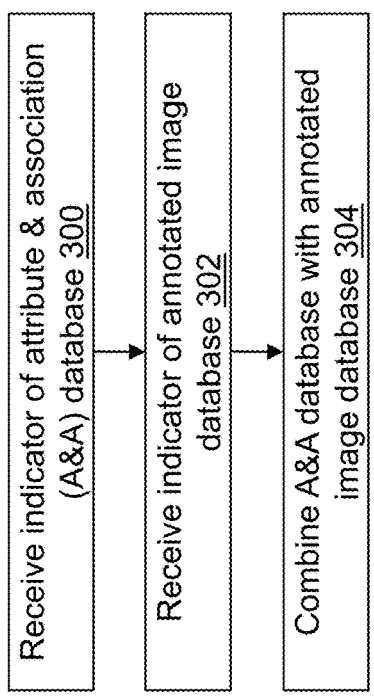
FIG. 3 depicts a flow diagram illustrating examples of operations performed by the data processing device of FIG. 1 to create an expanded, annotated image database in accordance with an illustrative embodiment.

Referring to FIG. 3, example operations associated with expand annotation application 128 are described. Additional, fewer, or different operations may be performed depending on the embodiment of expand annotation application 128. The order of presentation of the operations of FIG. 3 is not intended to be limiting. Although some of the operational flows are presented in sequence, the various operations may be performed in various repetitions, concurrently (in parallel, for example, using threads and/or the distributed computing system), and/or in other orders than those that are illustrated. For example, a user may execute expand annotation application 128, which causes presentation of a first user interface window, which may include a plurality of menus and selectors such as drop-down menus, buttons, text boxes, hyperlinks, etc. associated with expand annotation application 128 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by expand annotation application 128. For example, instead of receiving input through a user interface, the input may be read from a file stored on computer-readable medium 108 and/or on the distributed computing system.

In an operation 300, a second indicator may be received that indicates A&A database 130. The second indicator may indicate a location and a name of A&A database 130. As an example, the second indicator may be received by expand annotation application 128 after selection from a user interface window or after entry by a user into a user interface window. In an alternative embodiment, A&A database 130 may not be selectable. For example, a most recently created dataset may be used automatically. For example, a grid, a cube, a cloud, a Hadoop® cluster, a relational database, a file system, etc. location may be used automatically as a location/name of A&A database 130. As another example, A&A database 130 may be streamed to data processing device 100. An attribute describes a characteristic of a concept. An association describes a relationship between two concepts. In general a concept is a noun, an attribute is an adjective, and association is a verb.

Figure 6:
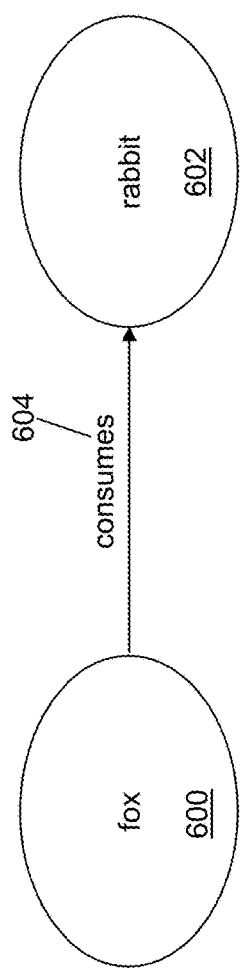
FIG. 6 shows an association between two concepts in accordance with an illustrative embodiment.

Referring to FIG. 6, an association between two concepts is shown in accordance with an illustrative embodiment. A fox concept 600 is related to a rabbit concept 602 such that fox concept 600 has a consumes association 604 rabbit concept 602. Of course, consumes association 604 may be recognized to be similar to various synonyms such as eats. Fox and rabbit are the concepts and are connected to each other with a predator-prey relationship, that is represented with 'consumes'.

Figure 7:
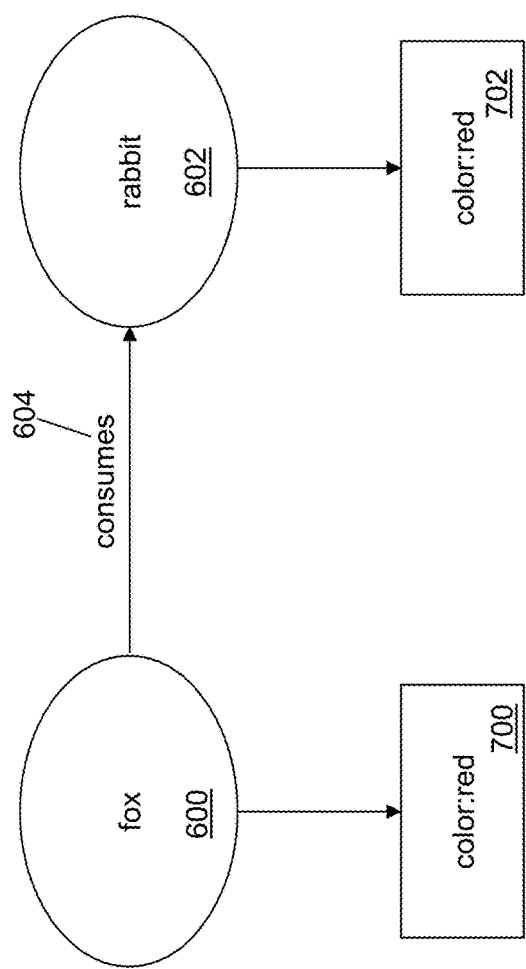
FIG. 7 shows an attribute of a concept in accordance with an illustrative embodiment.

Referring to FIG. 7, an attribute of a concept is shown in accordance with an illustrative embodiment. Fox concept 600 includes a first color attribute 700, and rabbit concept 602 includes a second color attribute 702. Unlike associations, attributes do not connect two concepts even if they share a common ground. For example, even though a rabbit and a fox can be red, they are not connected to each other based on that common characteristic. The differentiation between an attribute and association is important, especially for question answering and summarizing images. For example, when a fox and a rabbit are identified in the same image, summaries can be generated based on their associations, such as "there is a predator-prey relationship between fox and rabbit, and it's likely that the fox is hunting the rabbit." Using the attributes, on the other hand, generates a query result such as: "Red is one of the most common colors for foxes, although they can be brown or white as well."

Figures 11, 12:
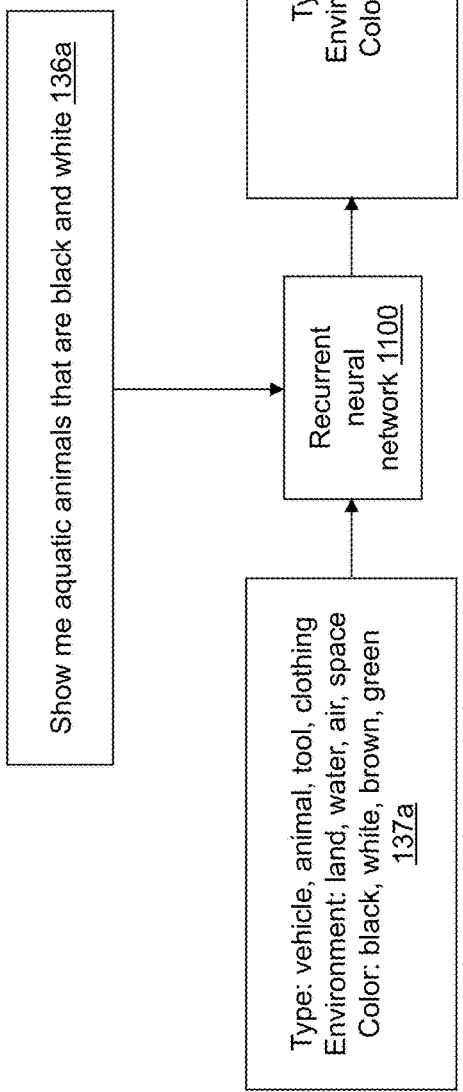
FIG. 11 shows a block diagram of a process to train a query model in accordance with an illustrative embodiment.
FIG. 12 shows a portion of an attribute and association database in accordance with an illustrative embodiment.

Referring to FIG. 12, a portion 1200 of A&A database 130 is shown in accordance with an illustrative embodiment. Each row after a first header row of A&A database 130 may be a data record of a plurality of data records stored in A&A database 130. Portion 1200 includes a concept name variable 1202, a plurality of attributes associated with concept name 1202, and a plurality of associations associated with concept name 1202. In the illustrative embodiment, A&A database 130 generally describes a subject matter domain of animals though other subject matter domains may be defined by A&A database 130 without limitation. For example, A&A database 130 may be related to a medical domain, an engineering domain, an interstellar object domain, a scientific domain, etc.

In the illustrative embodiment, the plurality of associations associated with concept name variable 1202 include an environment variable 1204, a location variable 1208, an eats variable 1214, an is eaten by variable 1216, etc. In the illustrative embodiment, the plurality of attributes associated with concept name variable 1202 include an animal type variable 1206, a body features variable 1210, a color variable 1212, a status variable 1218, etc. A&A database 130 may include a fewer or a greater number of associations and/or attributes. For example, additional attributes related to animals may include a sound variable, a motion variable, a distinguishing body part features variable, a used by variable, a method of preparation variable, etc.

Figure 8:
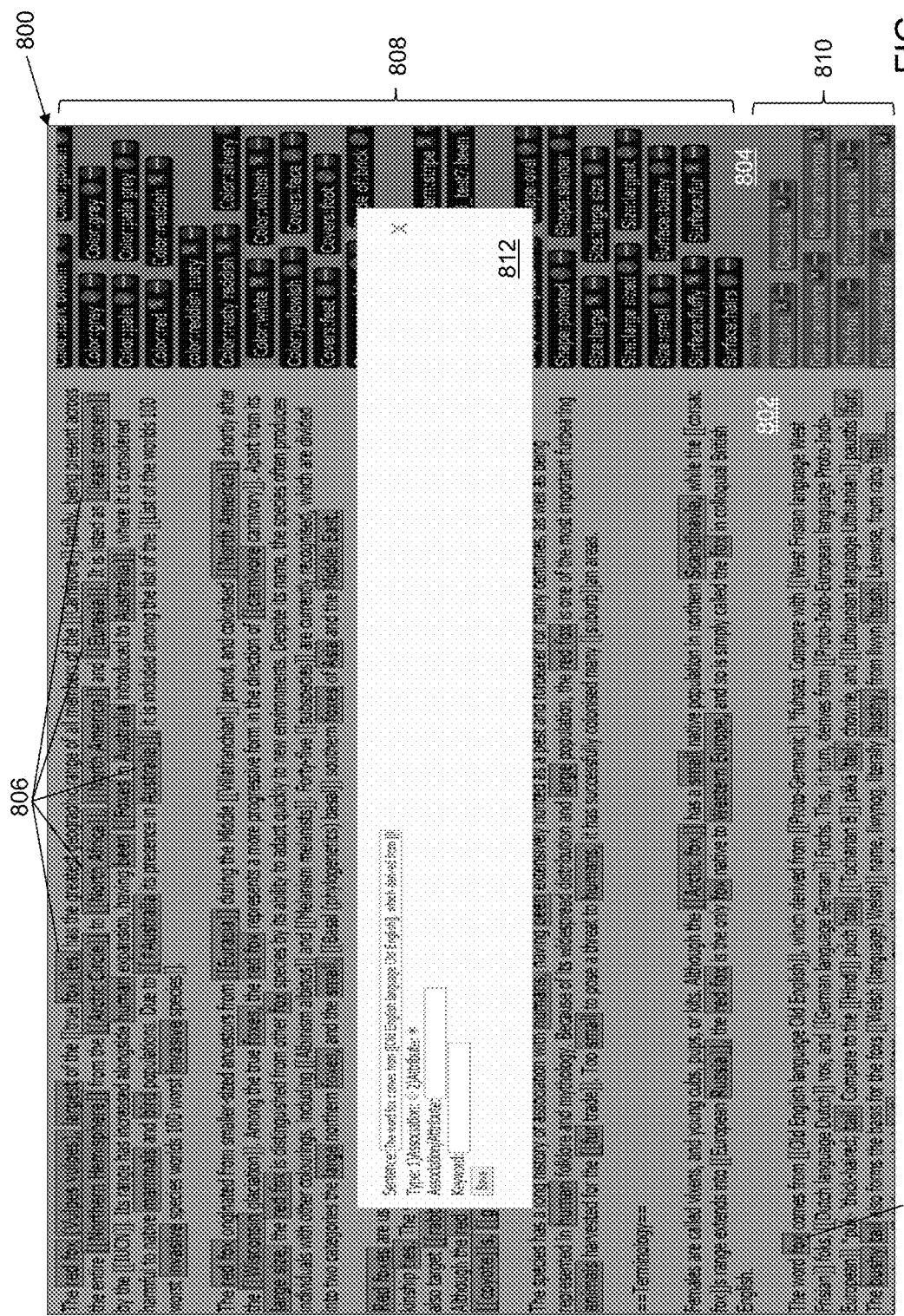
FIG. 8 shows a user interface used to define associations and attributes in accordance with an illustrative embodiment.

Referring to FIG. 8, a user interface 800 used to define associations and attributes is shown in accordance with an illustrative embodiment. A user may use user interface 800 to manually create A&A database 130. User interface 800 may include a knowledge base corpus section 802 and an A&A section 804. A&A section 804 includes an attributes section 808 and an associations section 810. In the illustrative embodiment, knowledge base corpus section 802 shows a parsed Wikipedia article. Initially, A&A section 804 does not contain any attributes or associations. For each extraction, the sentence is saved from which an attribute or association was extracted, the information about whether it's an association or attribute is saved, and a key-value pair (e.g., color:red, where color is a key and red is a value for this attribute example) is saved. After saving the extraction, highlighted text 806 is defined wherever the extracted attribute or association occurs whether at the extraction point or anywhere else.

Figure 9:
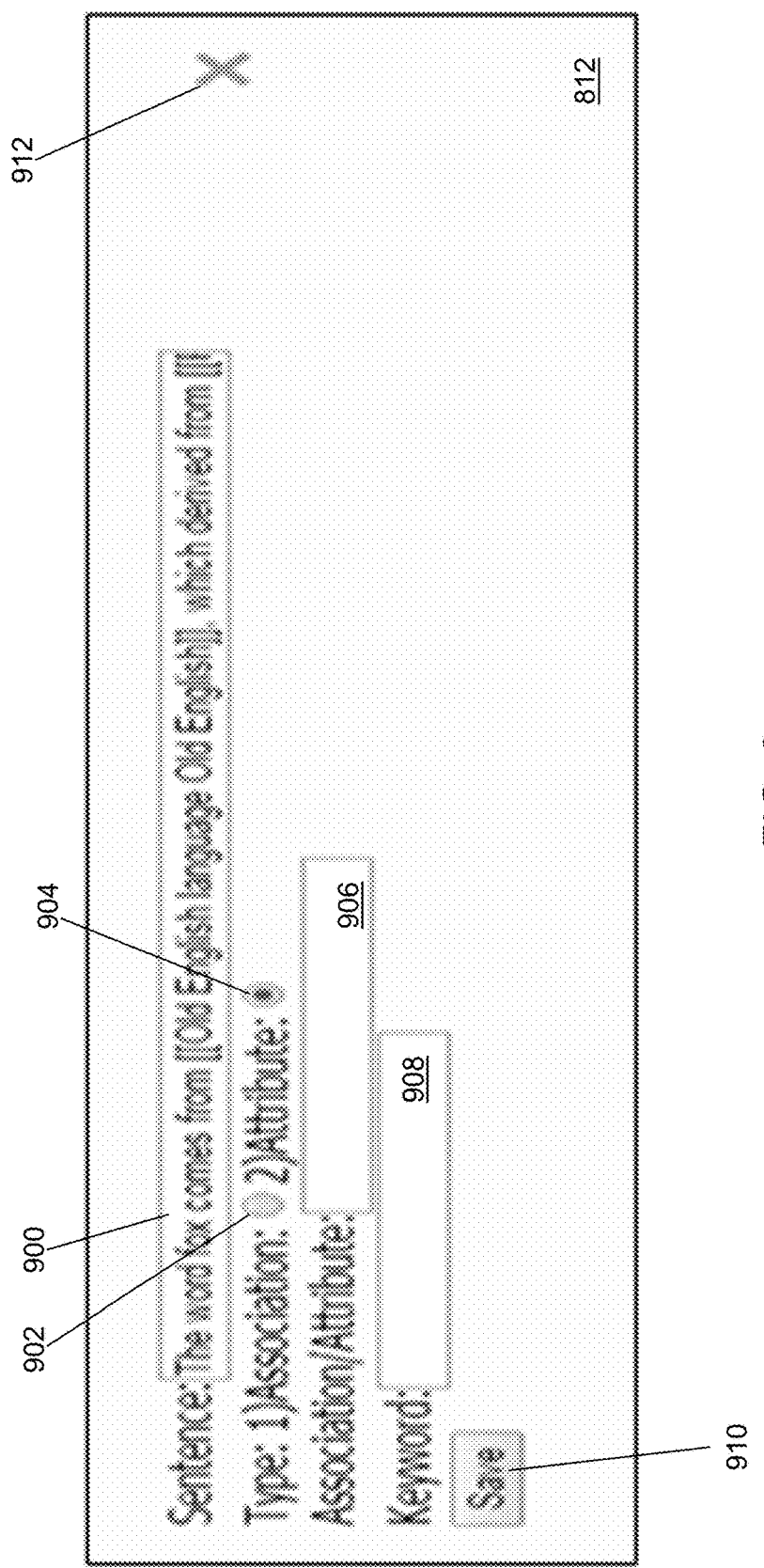
FIG. 9 shows a first zoomed portion of the user interface of FIG. 8 in accordance with an illustrative embodiment.

A text definition window 812 is presented when selected by the user to define an attribute or an association for first example text 814. Referring to FIG. 9, a zoomed view of text definition window 812 is shown in accordance with an illustrative embodiment. Text definition window 812 may include a sentence window 900, an association radio button 902, an attribute radio button 904, an association/attribute designator window 906, a keyword window 908, a save button 910, and a close selector 912. For example, a sentence is selected in knowledge base corpus section 802, and mouse 114 is right-clicked. As a result, the sentence is copied to sentence window 900 of text definition window 812 that may be a pop-up window. Sentence window 900 includes the sentence that includes first example text 814. The user selects either association radio button 902 or attribute radio button 904 to indicate whether an association or an attribute is being defined using text definition window 812. The user enters an association/attribute descriptor into associate/attribute designator window 906 and a keyword into keyword window 908 that together define either the association or the attribute. To save the entered selections, the user selects save button 910 to save a new entry in either attributes section 808 or associations section 810 based on selection of attribute radio button 904 or association radio button 902, respectively. The user selects close selector 912 to close text definition window 812. The keyword descriptor and the associate/attribute descriptor define a key value pair key:value. After saving, highlighted text 806 is updated to include the new attribute or association, and the new attribute or association is added to A&A section 804.

Referring to FIG. 10, a zoomed portion 1000 of knowledge base corpus section 802 and of associations section 810 is shown in accordance with an illustrative embodiment. Associations section 810 includes a first association indicator 1002 and a second association indicator 1012. Arrows show a relationship between zoomed portion 1000 and first association indicator 1002 and second association indicator 1012.

First association indicator 1002 may include a first association/attribute designator 1004, a first keyword designator 1006, a first validity designator 1008, and a first delete selector 1010. First association/attribute designator 1004 was previously entered into association/attribute designator window 906, and first keyword designator 1006 was previously entered into keyword window 908 with association radio button 902 to define a first key:value pair.

When working on another Wikipedia article, the attributes and associations saved previously in A&A database 130 are made available in A&A section 804 based on their existence in the text. In the case of their existence, the user has the option to accept or reject an attribute or association from a previous article for the current article. First validity designator 1008 shows a check mark indicating that the key:value pair defined by first association indicator 1002 has been accepted by the user. Delete selector 1010 is used by the user to delete the key:value pair defined by first association indicator 1002 from A&A database 130.

Second association indicator 1012 may include a second association/attribute designator 1014, a second keyword designator 1016, a second validity designator 1018, and a second delete selector 1020. Second association/attribute designator 1014 was previously entered into association/attribute designator window 906, and second keyword designator 1006 was previously entered into keyword window 908 with association radio button 902 to define a second key:value pair. Second validity designator 1018 shows an "X" mark indicating that the key:value pair defined by first association indicator 1002 has been rejected by the user.

Associations and attributes may be extracted automatically from a large source of information (e.g. Wikipedia) using a recurrent neural network (RNN). First, associations and attributes may be extracted manually as described referring to FIGS. 8 to 10 to create a corpus of training examples. The RNN is trained using the manually extracted examples to create an automatic association and attribute extractor.

For example, given a Wikipedia article, a set of associations and attributes, and their respective locations in the document the RNN determines whether each association or attribute is valid or invalid. An example of a valid attribute would be "color:red" for "a fox has red fur." An invalid attribute or association would be something picked by a greedy unigram attribute and association collector that is not relevant to the subject of the article. For example, " . . . the belly fur of vixens may turn brick red" may match "brick" and generate the attribute "made-of: brick." However, the RNN determines given the text and these examples that the text is likely saying that foxes are red and is likely not saying that they are works of masonry. Each attribute or association is marked as either valid or invalid, making this a binary decision task. To make this decision, a limited amount of semantic knowledge and the context surrounding the word is used, for example, to determine that "brick" in "brick red" refers to a color rather than a material. Semantic word embeddings with the RNN can be used.

The RNN is a neural network that travels across input, taking one at a time and recording both an output and a hidden state. The hidden state keeps track of what the network has seen before, giving it the ability to use previous input to inform its next decision. RNNs have been used for tasks that require language modeling such as image captioning, handwriting recognition, and machine translation, with Google recently beginning to use it in its own public-facing machine translation model as described in Vinyals, O., et al., *Show and Tell: A Neural Image Caption Generator*, In Proceedings of the IEEE Conference on Computer Vision and Pattern Recognition, 3156-3164 (2015); in Pham, V., & Kermorvant, C., *Dropout improves Recurrent Neural Networks for Handwriting Recognition*, In Proceedings of the Fourteenth International Conference on Frontiers in Handwriting Recognition, 285-290 (2013); and in Wu, Y., et al., *Google's Neural Machine Translation System: Bridging the Gap between Human and Machine Translation*, arXiv preprint arXiv:1609.08144, 1-23 (2016).

Semantic word embeddings may be generated on a large unsupervised text corpus by a system such as Word2Vec and use these to represent the words in the data Mikolov, T., et al., *Efficient Estimation of Word Representations in Vector Space*, arXiv preprint arXiv:1301.3781, 1-12 (2013). The RNN reads each proposed association and attribute along with a given window of surrounding words and general information from the rest of the article and generates a decision whether or not it is valid.

For example, referring to FIG. 25, a plurality of word vectors 2500 are input to a bidirectional text RNN 2502 that learns concept and attribute relation vectors. The plurality of word vectors 2500 may be loaded from Word2Vec or a similar word vector generation tool. The trained bidirectional text RNN 2502 outputs a sentence vector 2504 that is input to a fully connected neural network 2506 with a concept vector 2508 and an attribute vector 2510. For example, concept vector 2508 may be "fox" and attribute vector 2510 may be "made of: brick". The trained fully connected neural network 2506 outputs a validity prediction 2512 that is either "valid" or "invalid". For example, given the plurality of word vectors 2500 "fur", "turns", "brick", and "red", validity prediction 2512 with concept vector 2508 "fox" and attribute vector 2510 "made of: brick" indicates invalid. When the new attribute or the new association is valid, the new attribute or the new association is added to A&A database 130.

A&A database 130 can be continuously analyzed to discover new ones. For example, knowing that an arctic fox is a carnivore, it can be inferred that a red fox is also a carnivore. In addition to analyzing available discoveries, expert knowledge can be included by means of semantic rules that can be enforced A&A database 130. For example, indicating that animals do not have mechanical components and, conversely, that machines do not have body parts can trigger adjustments.

Referring again to FIG. 3, in an operation 302, a third indicator may be received that indicates annotated image database 126. The third indicator may indicate a location and a name of annotated image database 126. As an example, the third indicator may be received by expand annotation application 128 after selection from a user interface window or after entry by a user into a user interface window. In an alternative embodiment, annotated image database 126 may not be selectable. For example, a most recently created dataset may be used automatically. For example, a grid, a cube, a cloud, a Hadoop® cluster, a relational database, a file system, etc. location may be used automatically as a location/name of annotated image database 126. As another example, annotated image database 126 may be streamed to data processing device 100.

In an operation 304, A&A database 130 is combined with annotated image database 126 to define expanded annotated image database 132 that supplements annotated image database 126 with associations and attributes. A&A database 130 may be combined with annotated image database 126 using a pattern match between a concept name of a data record of A&A database 130 and an image label of annotated image database 126. A&A database 130 associated with annotations is useful for summarizing images as well as question answering. For example, knowing characteristics of a concept and its relationships with other concepts is important for answering questions about that concept as well as generating summaries about a scene depicted in an image.

Figure 4:
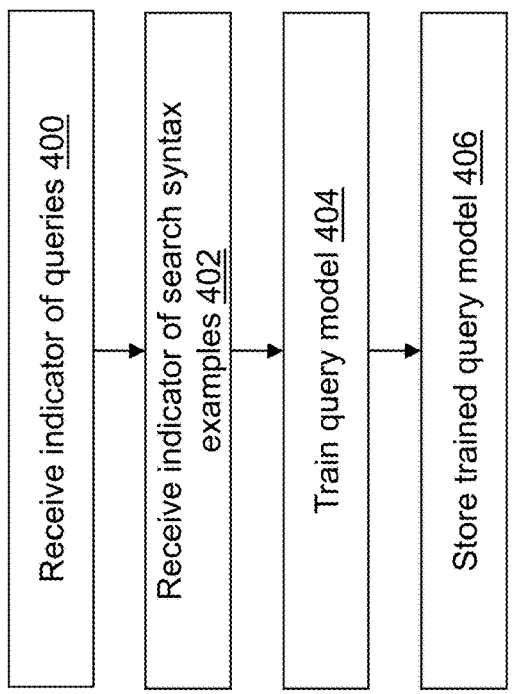
FIG. 4 depicts a flow diagram illustrating examples of operations performed by the data processing device of FIG. 1 to create a trained query model in accordance with an illustrative embodiment.

Referring to FIG. 4, example operations associated with query interpreter application 134 are described. Additional, fewer, or different operations may be performed depending on the embodiment of query interpreter application 134. The order of presentation of the operations of FIG. 4 is not intended to be limiting. Although some of the operational flows are presented in sequence, the various operations may be performed in various repetitions, concurrently (in parallel, for example, using threads and/or the distributed computing system), and/or in other orders than those that are illustrated. For example, a user may execute query interpreter application 134, which causes presentation of a first user interface window, which may include a plurality of menus and selectors such as drop-down menus, buttons, text boxes, hyperlinks, etc. associated with query interpreter application 134 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by query interpreter application 134. For example, instead of receiving input through a user interface, the input may be read from a file stored on computer-readable medium 108 and/or on the distributed computing system.

In an operation 400, a fourth indicator may be received that indicates queries 136. The fourth indicator may indicate a location and a name of queries 136. As an example, the fourth indicator may be received by query interpreter application 134 after selection from a user interface window or after entry by a user into a user interface window. In an alternative embodiment, queries 136 may not be selectable. For example, a most recently created dataset may be used automatically. For example, a grid, a cube, a cloud, a Hadoop® cluster, a relational database, a file system, etc. location may be used automatically as a location/name of queries 136. As another example, queries 136 may be streamed to data processing device 100.

In an operation 402, a fifth indicator may be received that indicates search syntax examples 137. The fifth indicator may indicate a location and a name of search syntax examples 137. As an example, the fifth indicator may be received by query interpreter application 134 after selection from a user interface window or after entry by a user into a user interface window. In an alternative embodiment, search syntax examples 137 may not be selectable. For example, a most recently created dataset may be used automatically. For example, a grid, a cube, a cloud, a Hadoop® cluster, a relational database, a file system, etc. location may be used automatically as a location/name of search syntax examples 137. As another example, search syntax examples 137 may be streamed to data processing device 100.

In an operation 404, a query model is trained using queries 136 and search syntax examples 137. For illustration, the query model may be a second RNN model trained using the NNET procedure provided by the SAS® Visual Data Mining and Machine Learning tool. The recurrent neural network model can be constructed with a number of gated unit layers (e.g., long short-term memory units or gated recurrent units (GRU)). Each layer in the architecture can contain many neurons (e.g., 100 or 200). Bi-directional GRU layers may be used though other layers can be used as well. Search syntax examples 137 provides a vocabulary of the named concepts in A&A database 130. The output is the generated interim search syntax that can be run against the index defined for expanded, annotated image database 132. Search syntax examples 137 tunes the system to specialize in the context or domain of A&A database 130. For example, if A&A database 130 concerns animals, the query model does not need to learn anything about automobiles.

In an operation 406, the trained query model is stored in trained query model 138. For example, parameters (e.g., RNN weights) used to instantiate the query model are stored in trained query model 138. For illustration, the trained query model may be stored using the ASTORE procedure provided by the SAS® Visual Data Mining and Machine Learning tool. Using an RNN increases the coverage of trained query model 138 to understand all natural language queries. Designing A&A database 130 to represent the whole world with attributes and associations provides the flexibility to answer questions that are not available in an image. In other words, questions that cannot be visually represented can be answered. For example, the fact that an animal belongs to an endangered species cannot be extracted from an image. Trained query model 138 enables a search of concepts that are not available in annotated images database 126. For example, pattern matching cannot connect a query for "aquatic" with the value "water" in expanded annotated image database 132.

Referring to FIG. 11, a block diagram of a training phase for the query model is shown in accordance with an illustrative embodiment. A first query 136a and first search syntax examples 137a are input to a recurrent neural network model 1100. A search syntax result 1104 is output from recurrent neural network model 1100 in response to first query 136a.

Figure 13:
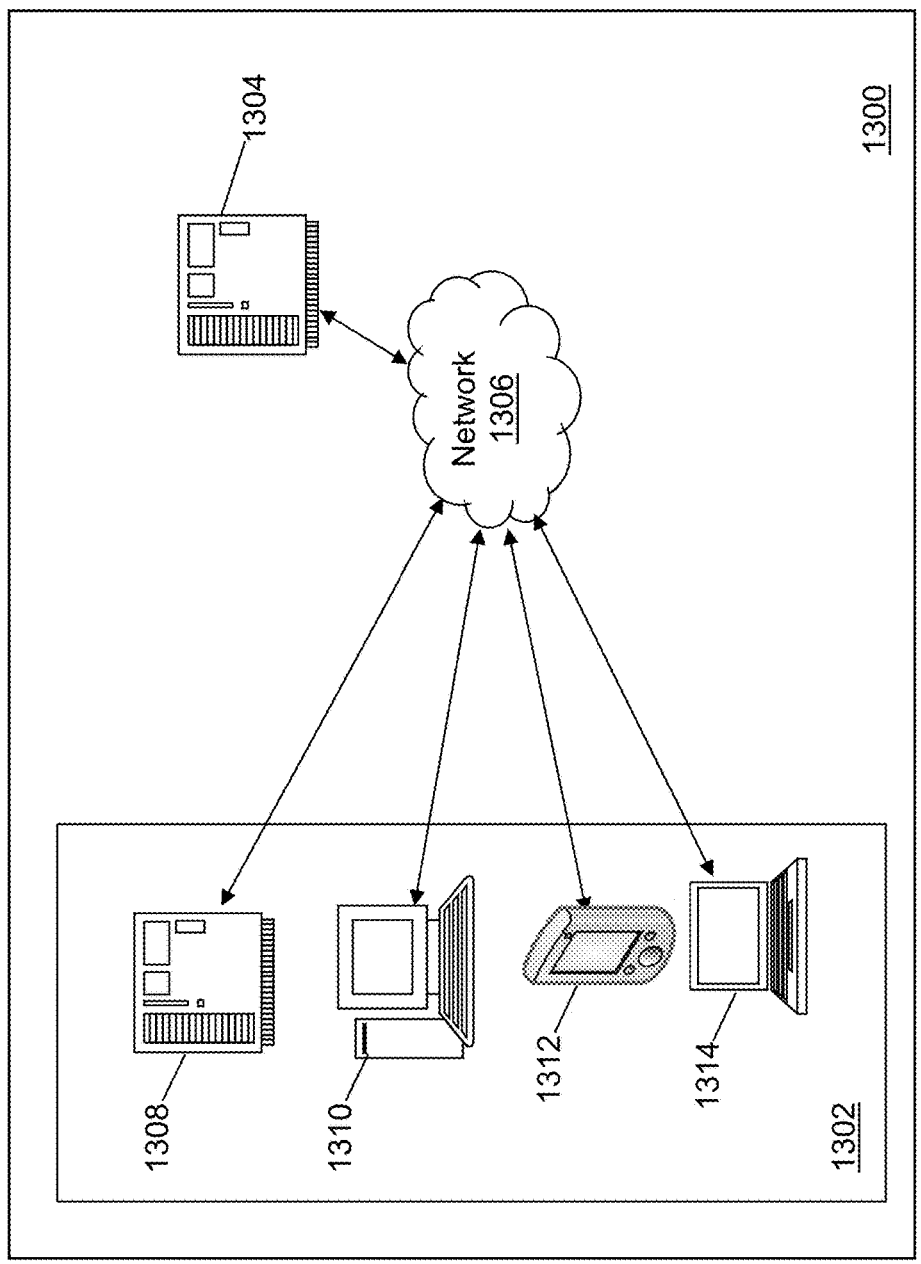
FIG. 13 depicts a block diagram of a query processing system in accordance with an illustrative embodiment.

Referring to FIG. 13, a block diagram of a query processing system 1300 is shown in accordance with an illustrative embodiment. In an illustrative embodiment, query processing system 1300 may include a user system 1302, a query resolution device 1304, and a network 1306. Each of user system 1302 and query resolution device 1304 may be composed of one or more discrete devices in communication through network 1306.

Network 1306 may include one or more networks of the same or different types. Network 1306 can be any type of wired and/or wireless public or private network including a cellular network, a local area network, a wide area network such as the Internet or the World Wide Web, etc. Network 1306 further may comprise sub-networks and consist of any number of communication devices.

The one or more computing devices of user system 1302 may include computing devices of any form factor such as a server computer 1308, a desktop 1310, a smart phone 1312, a laptop 1314, a personal digital assistant, an integrated messaging device, a tablet computer, a point of sale system, a transaction system, etc. User system 1302 can include any number and any combination of form factors of computing devices that may be organized into subnets. The computing devices of user system 1302 send and receive signals through network 1306 to/from another of the one or more computing devices of user system 1302 and/or to/from query resolution device 1304. The one or more computing devices of user system 1302 may communicate using various transmission media that may be wired and/or wireless as understood by those skilled in the art. The one or more computing devices of user system 1302 may be geographically dispersed from each other and/or co-located. Each computing device of the one or more computing devices of user system 1302 may be executing a query application 1422 (shown referring to FIG. 14) of the same or different type.

Query resolution device 1304 can include any form factor of computing device. For illustration, FIG. 13 represents query resolution device 1304 as a server computer. In general, a server computer may include faster processors, additional processors, more disk memory, and/or more random-access memory (RAM) than a client computer and support multi-threading as understood by a person of skill in the art. Query resolution device 1304 sends and receives signals through network 1306 to/from user system 1302 and/or to/from the distributed computing system. Query resolution device 1304 may communicate using various transmission media that may be wired and/or wireless as understood by those skilled in the art. Query resolution device 1304 may be implemented on a plurality of computing devices of the same or different type that support failover processing.

Data processing device 100, query resolution device 1304, and/or query submission device 1400 may be integrated in a single computing device.

Figure 14:
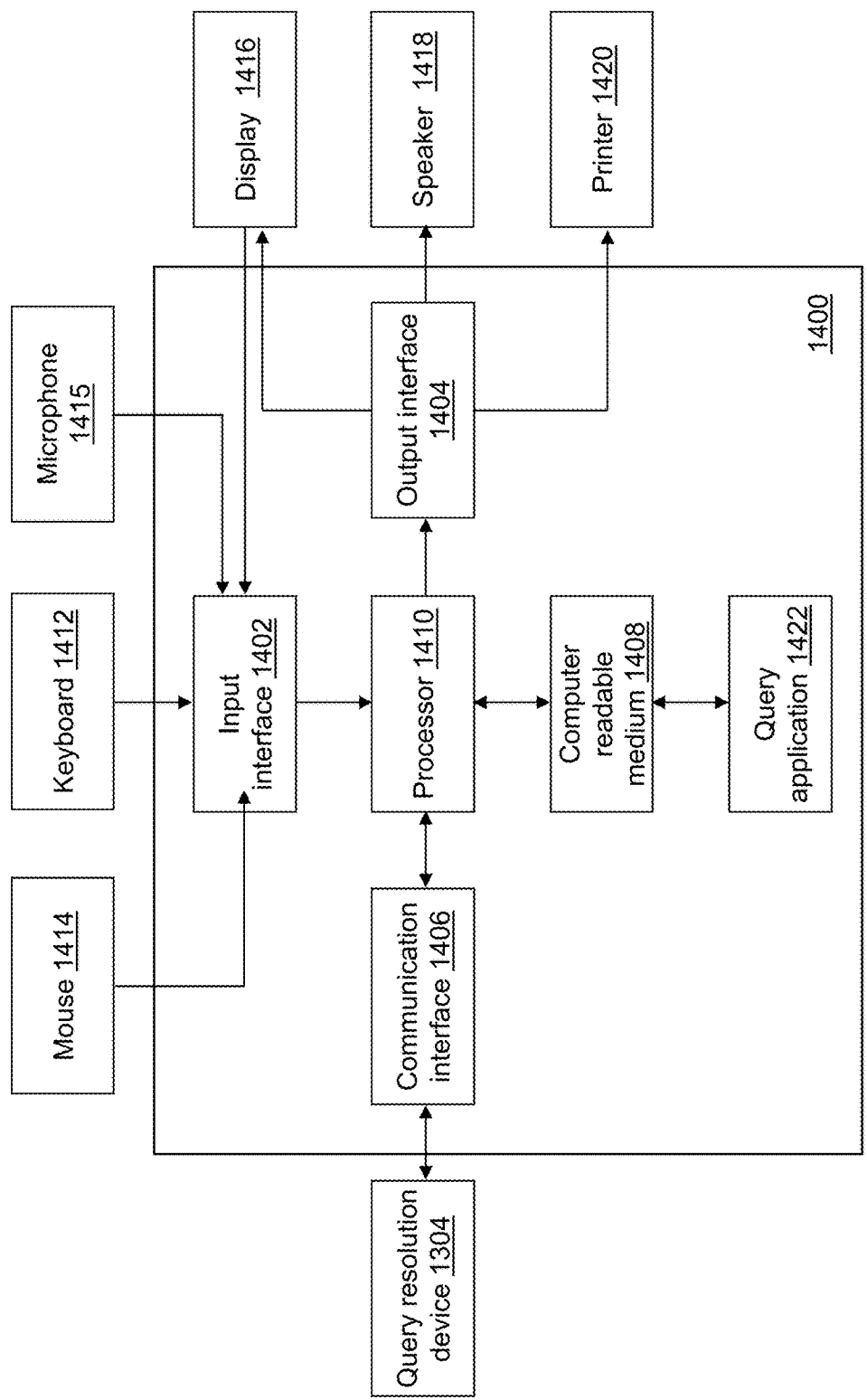
FIG. 14 depicts a block diagram of a query submission device of the query processing system of FIG. 13 in accordance with an illustrative embodiment.

Referring to FIG. 14, a block diagram of a query submission device 1400 of user system 1302 is shown in accordance with an example embodiment. Query submission device 1400 is an example computing device of user system 1302. For example, each of server computer 1308, desktop 1310, smart phone 1312, and laptop 1314 may be an instance of query submission device 1400. Query submission device 1400 may include a second input interface 1402, a second output interface 1404, a second communication interface 1406, a second computer-readable medium 1408, a second processor 1410, and query application 1422. Each query submission device 1400 of user system 1302 may include the same or different components and combinations of components. Fewer, different, and additional components may be incorporated into query submission device 1400.

Second input interface 1402 provides the same or similar functionality as that described with reference to input interface 102 of data processing device 100 though referring to query submission device 1400. Second output interface 1404 provides the same or similar functionality as that described with reference to output interface 104 of data processing device 100 though referring to query submission device 1400. Second communication interface 1406 provides the same or similar functionality as that described with reference to communication interface 106 of data processing device 100 though referring to query submission device 1400. Data and messages may be transferred between query submission device 1400 and query resolution device 1304 using second communication interface 1406. Second computer-readable medium 1408 provides the same or similar functionality as that described with reference to computer-readable medium 108 of data processing device 100 though referring to query submission device 1400. Second processor 1410 provides the same or similar functionality as that described with reference to processor 110 of data processing device 100 though referring to query submission device 1400.

Query application 1422 performs operations associated with receiving a query, for example, from a user, and requesting a resolution to the query. The query may not be in the form of a question and may be comprised of keywords and/or natural language. The operations may be implemented using hardware, firmware, software, or any combination of these methods. Referring to the example embodiment of FIG. 14, query application 1422 is implemented in software (comprised of computer-readable and/or computer-executable instructions) stored in second computer-readable medium 1408 and accessible by second processor 1410 for execution of the instructions that embody the operations of query application 1422. Query application 1422 may be written using one or more programming languages, assembly languages, scripting languages, etc. Query application 1422 may be implemented as a Web application. Query application 1422 may be or may be integrated with an existing browser application such as Internet Explorer, Microsoft Edge, Google Chrome, Mozilla Firefox, etc.

Figure 15:
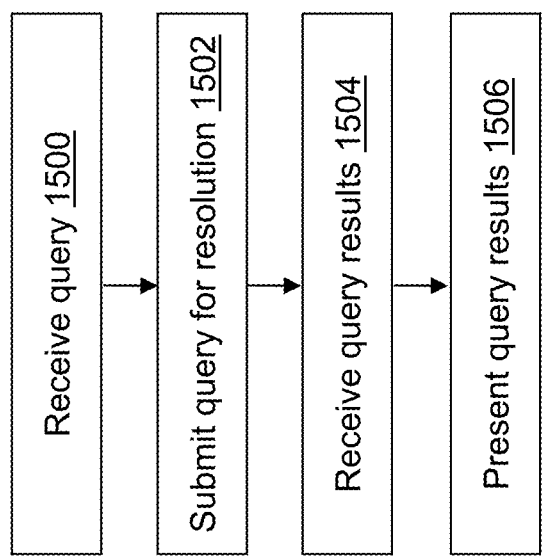
FIG. 15 depicts a flow diagram illustrating examples of operations performed by the query submission device of FIG. 14 in accordance with an illustrative embodiment.

Referring to FIG. 15, example operations associated with query application 1422 are described. Additional, fewer, or different operations may be performed depending on the embodiment. The order of presentation of the operations of FIG. 15 is not intended to be limiting. A user can interact with one or more user interface windows presented to the user in a display under control of query application 1422 independently or through a browser application in an order selectable by the user. Although some of the operational flows are presented in sequence, the various operations may be performed in various repetitions, concurrently, and/or in other orders than those that are illustrated. For example, a user may execute query application 1422, which causes presentation of a first user interface window, which may include a plurality of menus and selectors such as drop-down menus, buttons, text boxes, hyperlinks, etc. associated with query application 1422 as understood by a person of skill in the art. As further understood by a person of skill in the art, various operations may be performed in parallel, for example, using a plurality of threads or a plurality of computing devices such as a grid or a cloud of computing devices.

In an operation 1500, a query is received. For example, the query may be received after entry by a user into a search engine text box or other user interface window presented under control of query application 1422 using a keyboard 1412, a mouse 1414, a microphone 1415, etc.

In an operation 1502, the received query is submitted for resolution. For example, the received query is sent to query resolution device 1304 in an HTTP request.

In an operation 1504, one or more query results may be received from query resolution device 1304 in an HTTP response. The query result may include zero or more images and/or textual or numeric content. In some cases, the query result may indicate that no response was identified.

In an operation 1506, the received one or more query results are presented to the user. For example, an image may be presented using a display 1416 or a printer 1420, textual or numeric content may be presented using display 1416, printer 1420, a speaker 1420, etc.

Figure 16:
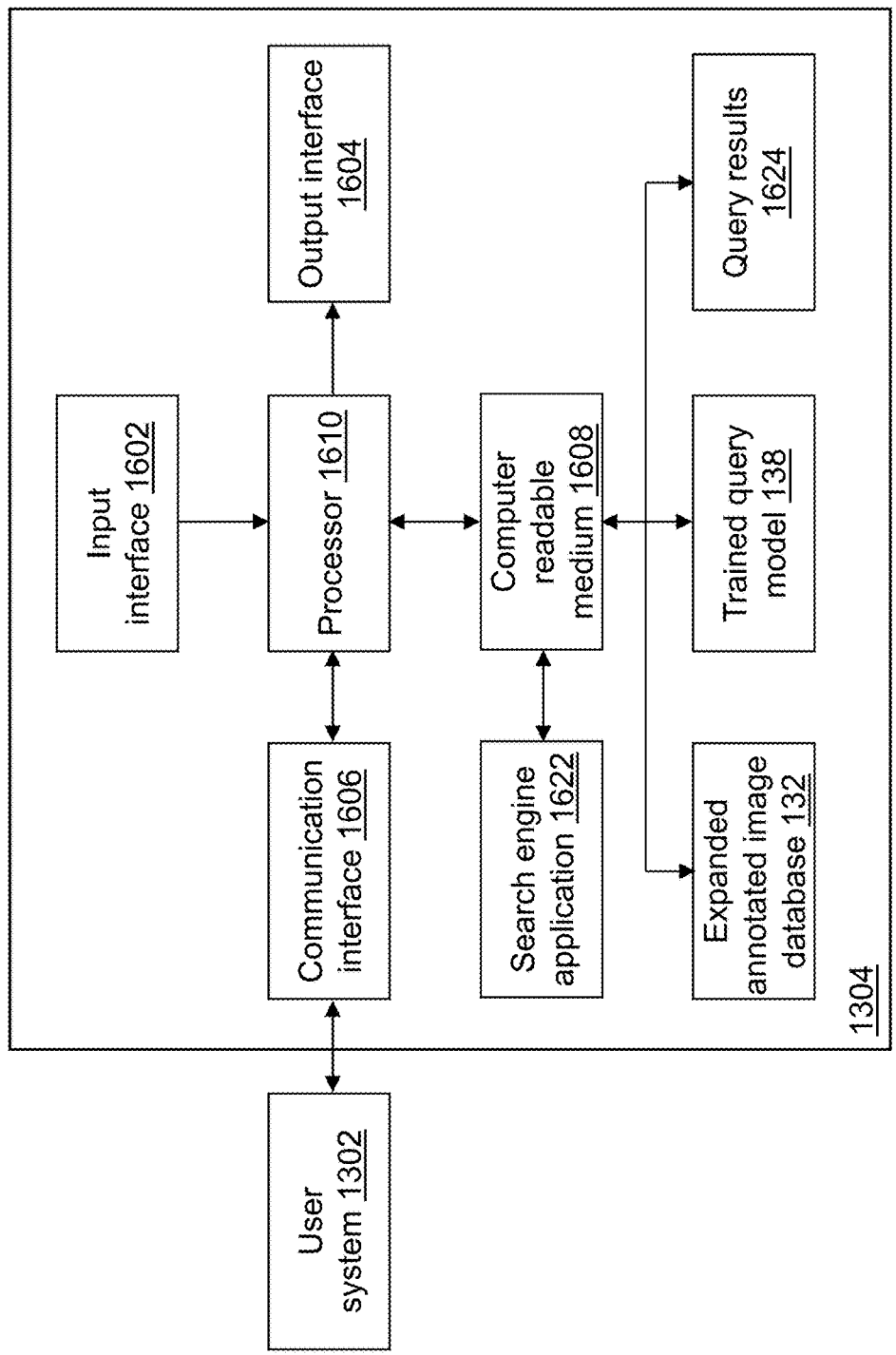
FIG. 16 depicts a block diagram of a query resolution device of the query processing system of FIG. 13 in accordance with an illustrative embodiment.

Referring to FIG. 16, a block diagram of query resolution device 1304 is shown in accordance with an example embodiment. Query resolution device 1304 may include a third input interface 1602, a third output interface 1604, a third communication interface 1606, a third computer-readable medium 1608, a third processor 1610, and a search engine application 1622, expanded annotated image database 132, trained query model 138, and query results 1624. Fewer, different, and additional components may be incorporated into query resolution device 1304.

Expanded annotated image database 132 and/or trained query model 138 may be stored on third computer-readable medium 1608 and/or on one or more computer-readable media of the distributed computing system and accessed by or received by query resolution device 1304 using third communication interface 1606, third input interface 1602, and/or third output interface 1604. Expanded annotated image database 132 and/or trained query model 138 may be stored using various data structures as known to those skilled in the art including one or more files of a file system, a relational database, one or more tables of a system of tables, a structured query language database, etc. on query resolution device 1304 or on the distributed computing system that may be the same or different. Query resolution device 1304 may coordinate access to expanded annotated image database 132 and/or trained query model 138 that are distributed across the distributed computing system that may include one or more computing devices. For example, expanded annotated image database 132 may be stored in a cube distributed across a grid of computers as understood by a person of skill in the art. As another example, expanded annotated image database 132 may be stored in a multi-node Hadoop® cluster. As another example, expanded annotated image database 132 may be stored in a cloud of computers and accessed using cloud computing technologies, as understood by a person of skill in the art. The SAS® LASR™ Analytic Server may be used as an analytic platform to enable multiple users to concurrently access data stored in expanded annotated image database 132. The SAS® Viya™ open, cloud-ready, in-memory architecture also may be used as an analytic platform to enable multiple users to concurrently access data stored in expanded annotated image database 132. Some systems may use SAS In-Memory Statistics for Hadoop® to read big data once and analyze it several times by persisting it in-memory for the entire session. Some systems may be of other types and configurations.

Third input interface 1602 provides the same or similar functionality as that described with reference to input interface 102 of data processing device 100 though referring to query resolution device 1304. Third output interface 1604 provides the same or similar functionality as that described with reference to output interface 104 of data processing device 100 though referring to query resolution device 1304. Third communication interface 1606 provides the same or similar functionality as that described with reference to communication interface 106 of data processing device 100 though referring to query resolution device 1304. Data and messages may be transferred between query resolution device 1304 and user system 1302 or the distributed computing system using third communication interface 1606. Third computer-readable medium 1608 provides the same or similar functionality as that described with reference to computer-readable medium 108 of data processing device 100 though referring to query resolution device 1304. Third processor 1610 provides the same or similar functionality as that described with reference to processor 110 of data processing device 100 though referring to query resolution device 1304.

Search engine application 1622 performs operations associated with receiving a query and determining query results 1624. The operations may be implemented using hardware, firmware, software, or any combination of these methods. Referring to the example embodiment of FIG. 16, search engine application 1622 is implemented in software (comprised of computer-readable and/or computer-executable instructions) stored in third computer-readable medium 1608 and accessible by third processor 1610 for execution of the instructions that embody the operations of search engine application 1622. Search engine application 1622 may be written using one or more programming languages, assembly languages, scripting languages, etc. Search engine application 1622 may be implemented as a Web application.

Figure 17:
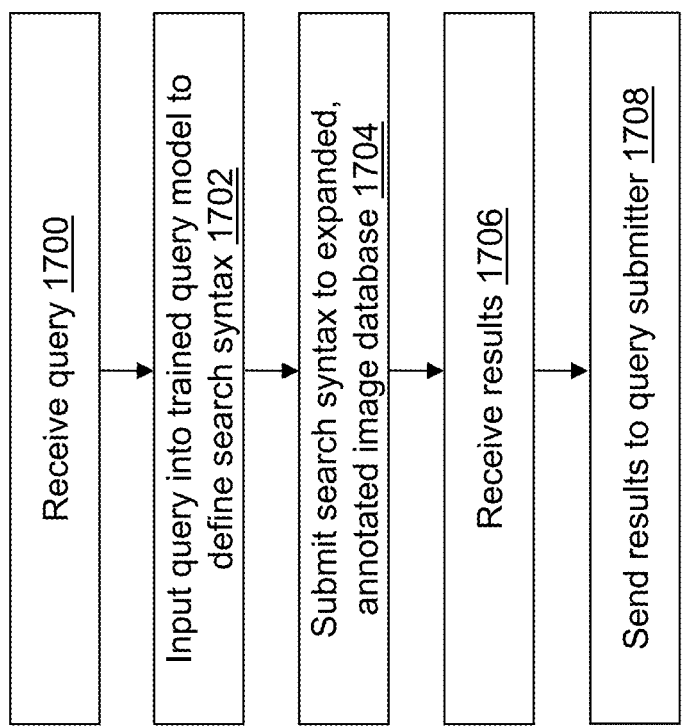
FIG. 17 depicts a flow diagram illustrating examples of operations performed by the query resolution device of FIG. 16 in accordance with an illustrative embodiment.

Referring to FIG. 17, a flow diagram illustrating examples of operations performed by search engine application 1622 is shown in accordance with an illustrative embodiment. Additional, fewer, or different operations may be performed depending on the embodiment of search engine application 1622. The order of presentation of the operations of FIG. 17 is not intended to be limiting. Although some of the operational flows are presented in sequence, the various operations may be performed in various repetitions, concurrently (in parallel, for example, using threads and/or the distributed computing system), and/or in other orders than those that are illustrated.

In an operation 1700, a query is received. The query may include keywords and/or free text (natural language sentences). If keywords are used for searching, wild cards (e.g., zebr*→find matches that start with zebr), and filtering (e.g., zebra-crocodile→find matches with zebra but not crocodile) may be used. If the query includes natural language text, a full sentence can be used, but it is also possible to use an interim language such as that used for Google searches: for example, "jaguar-car" would mean finding documents containing information about jaguars, but not containing information about cars.

In an operation 1702, the received query is input to trained query model 138 to define a search syntax.

In an operation 1704, the defined search syntax is submitted to expanded, annotated image database 132.

In an operation 1706, query results 1624 are received in response to the submission. Query results 1624 may include zero or more results. Query results 1624 are determined based on matching the defined search syntax to one or more of the plurality of attributes or one or more of the plurality of associations of expanded annotated image database 132, wherein the query result includes a concept image of a concept associated with the matched one or more of the plurality of attributes or one or more of the plurality of associations.

In an operation 1708, query results 1624 are sent to query submission device 1400. When query results 1624 include zero results, an indicator that no results were identified may be sent to query submission device 1400.

Referring to FIGS. 18 to 24, illustrative examples of receiving a query and providing query results 1624 is provided.

Figure 18:
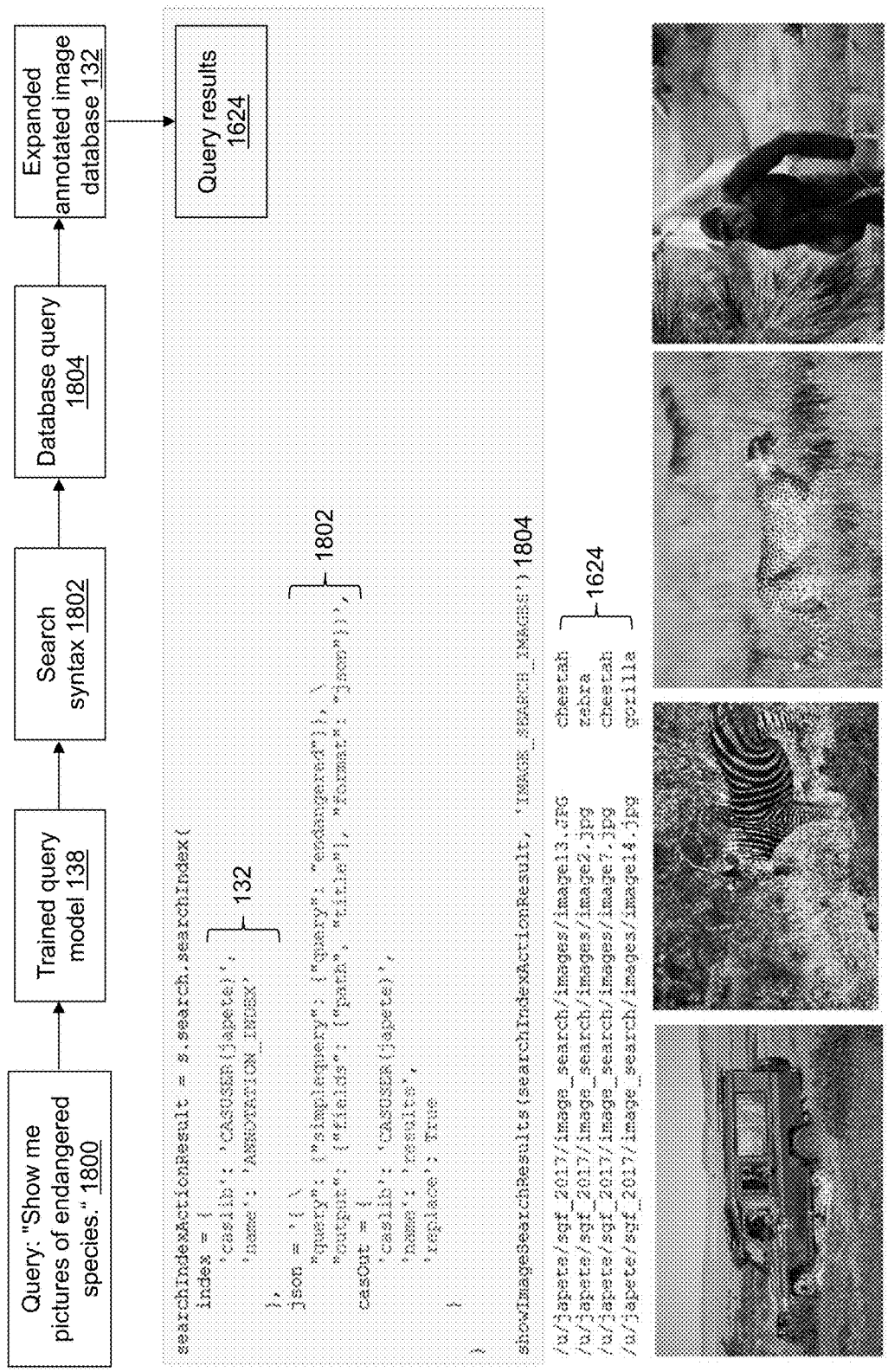
FIG. 18 depicts a block diagram of a first query resolution by the query processing system of FIG. 13 in accordance with an illustrative embodiment.

Referring to FIG. 18, a first query 1800 ("Show me pictures of endangered species") was input to trained query model 138 to define a first search syntax 1802 included in a first database query 1804 to expanded, annotated image database 132 to generate query results 1624. In the illustrative embodiment, JavaScript object notation (JSON) was used as the search syntax and was included in an action submitted to expanded, annotated image database 132 using search index functionality provided by SAS® Viya™. Four images were identified and included in query results 1624. Query results 1624 may be presented in a rank order based on a likelihood that each result is relevant to the query.

Figure 19:
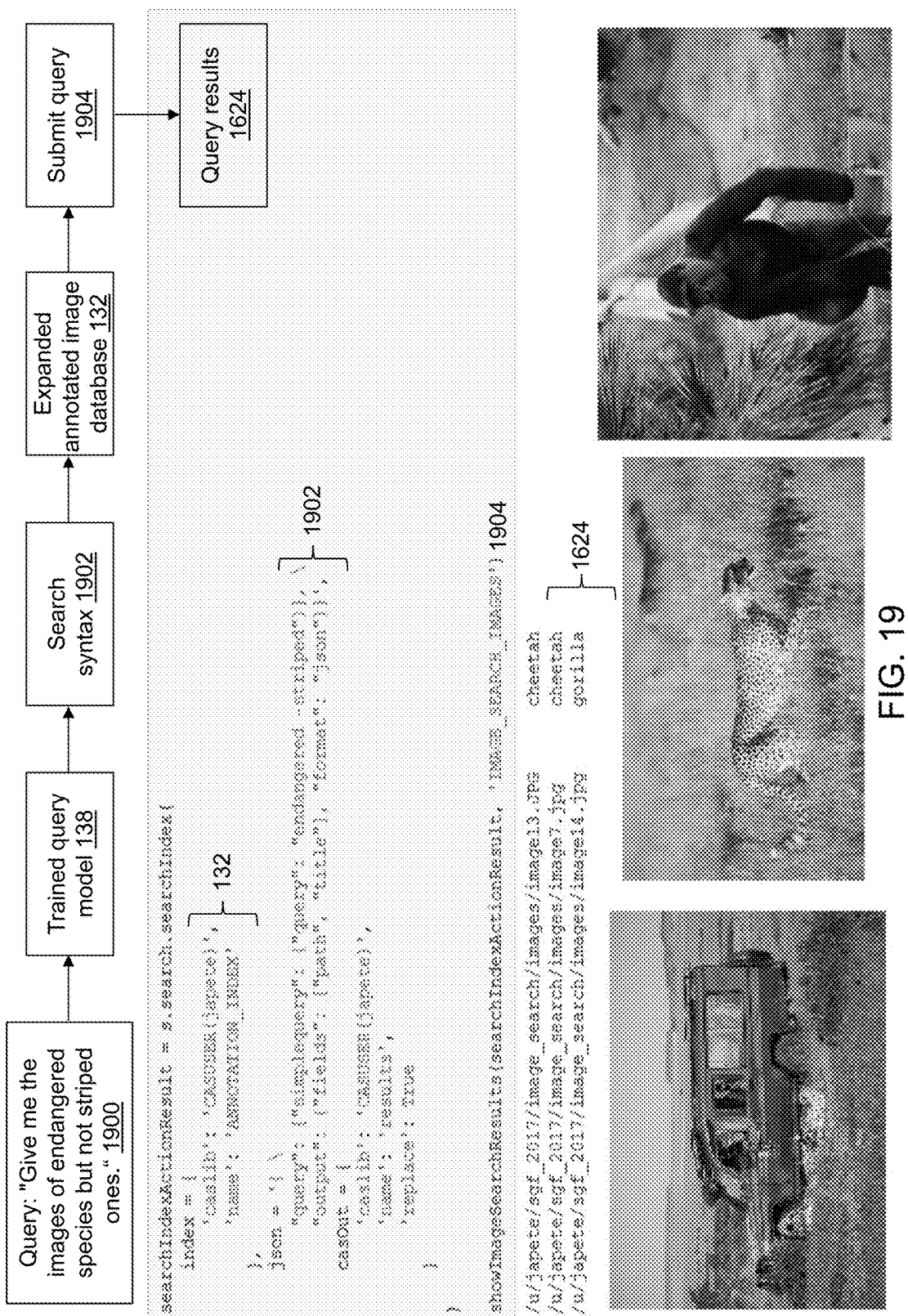
FIG. 19 depicts a block diagram of a second query resolution by the query processing system of FIG. 13 in accordance with an illustrative embodiment.

Referring to FIG. 19, a second query 1900 ("Give me the images of endangered species but not striped ones") was input to trained query model 138 to define a second search syntax 1902 included in a second database query 1904 to expanded, annotated image database 132 to generate query results 1624. Again, in the illustrative embodiment, JSON was used as the search syntax and was included in an action submitted to expanded, annotated image database 132 using search index functionality provided by SAS® Viya™. Three images were identified and included in query results 1624.

Figure 20:
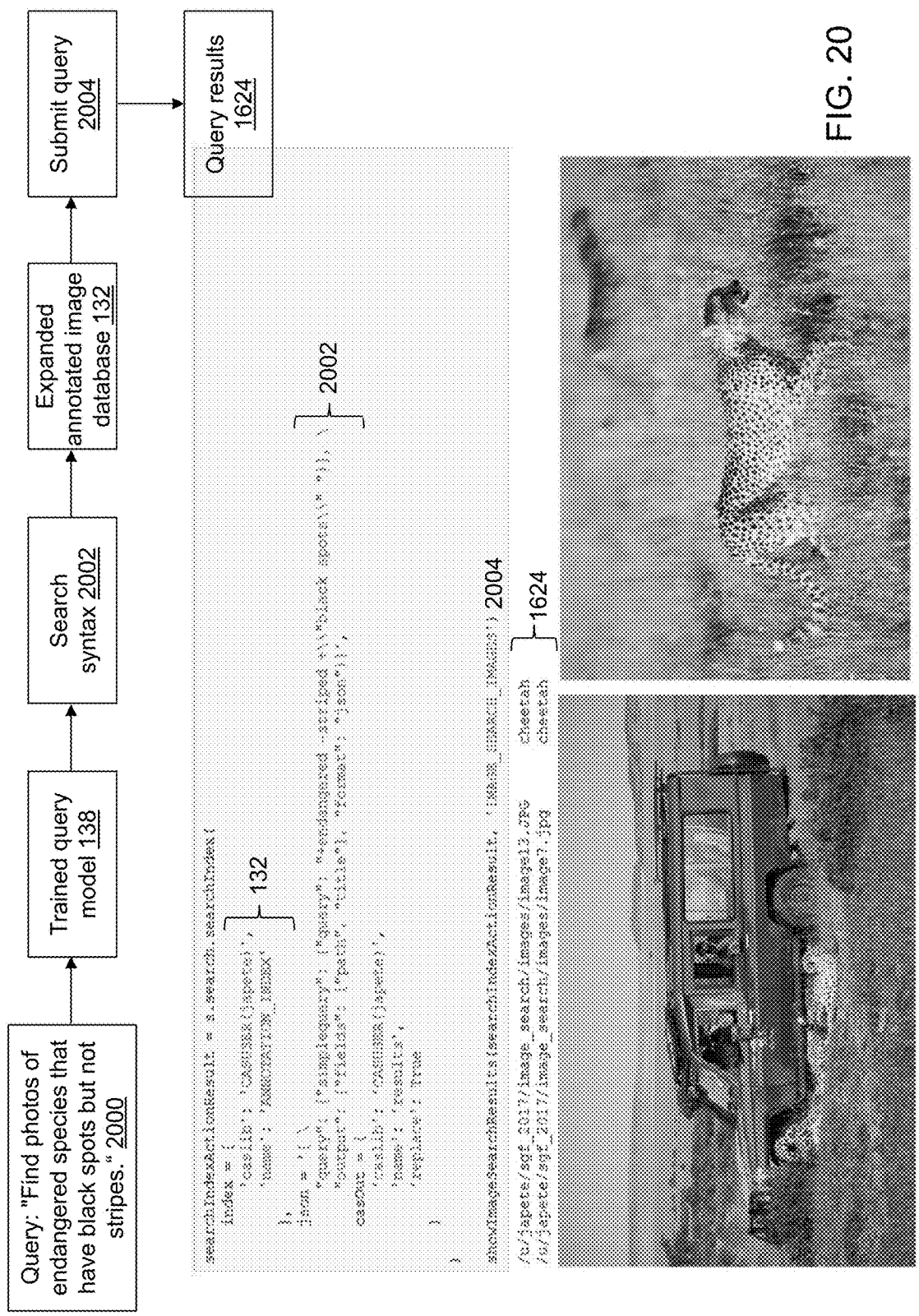
FIG. 20 depicts a block diagram of a third query resolution by the query processing system of FIG. 13 in accordance with an illustrative embodiment.

Referring to FIG. 20, a third query 2000 ("Find photos of endangered species that have black spots but not stripes") was input to trained query model 138 to define a third search syntax 2002 included in a third database query 2004 to expanded, annotated image database 132 to generate query results 1624. Again, in the illustrative embodiment, JSON was used as the search syntax and was included in an action submitted to expanded, annotated image database 132 using search index functionality provided by SAS® Viya™. Two images were identified and included in query results 1624.

Figure 21:
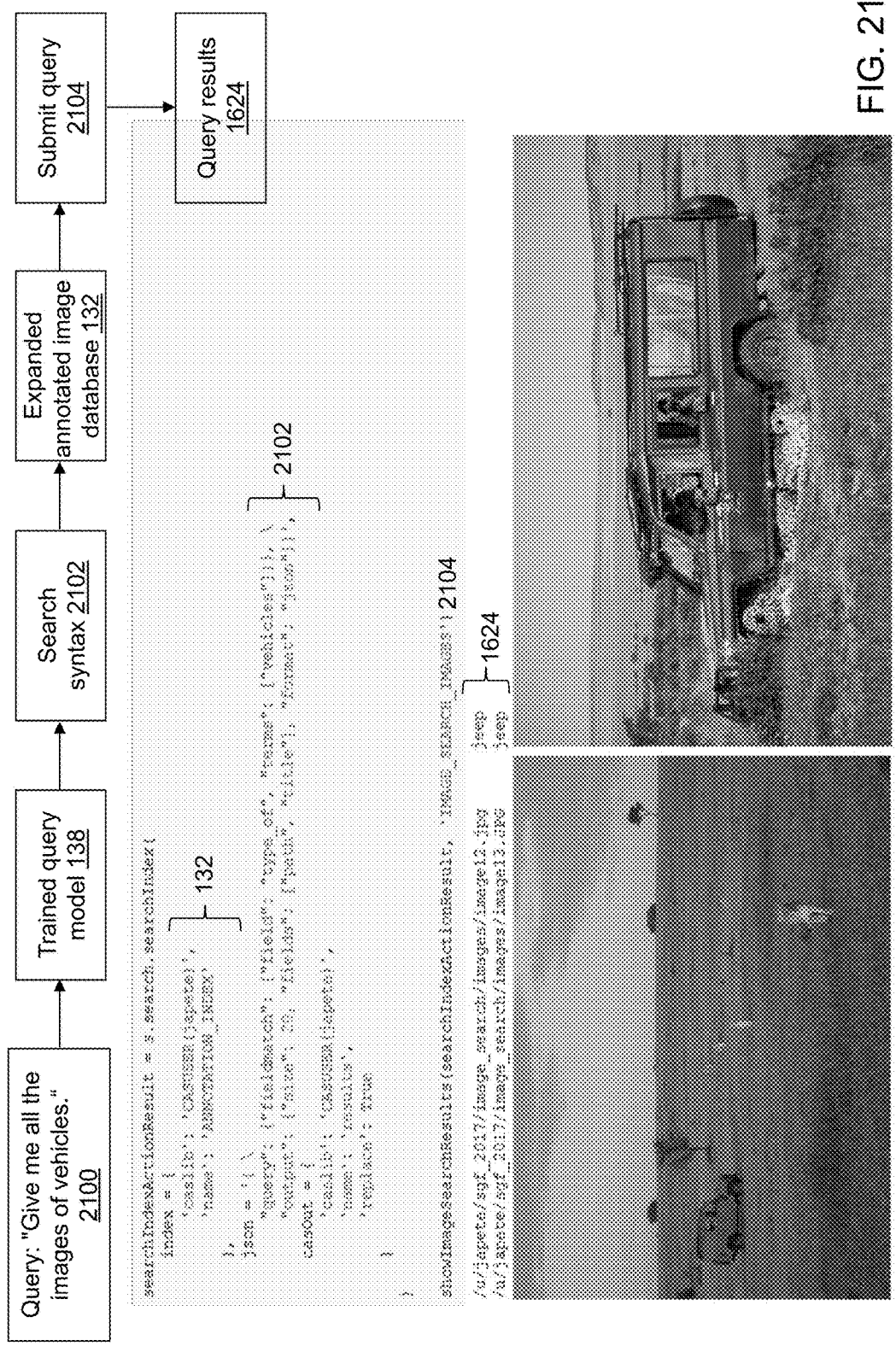
FIG. 21 depicts a block diagram of a fourth query resolution by the query processing system of FIG. 13 in accordance with an illustrative embodiment.

Referring to FIG. 21, a fourth query 2100 ("Give me all the images of vehicles") was input to trained query model 138 to define a fourth search syntax 2102 included in a fourth database query 2104 to expanded, annotated image database 132 to generate query results 1624. Again, in the illustrative embodiment, JSON was used as the search syntax and was included in an action submitted to expanded, annotated image database 132 using search index functionality provided by SAS® Viya™. Two images were identified and included in query results 1624.

Figure 22:
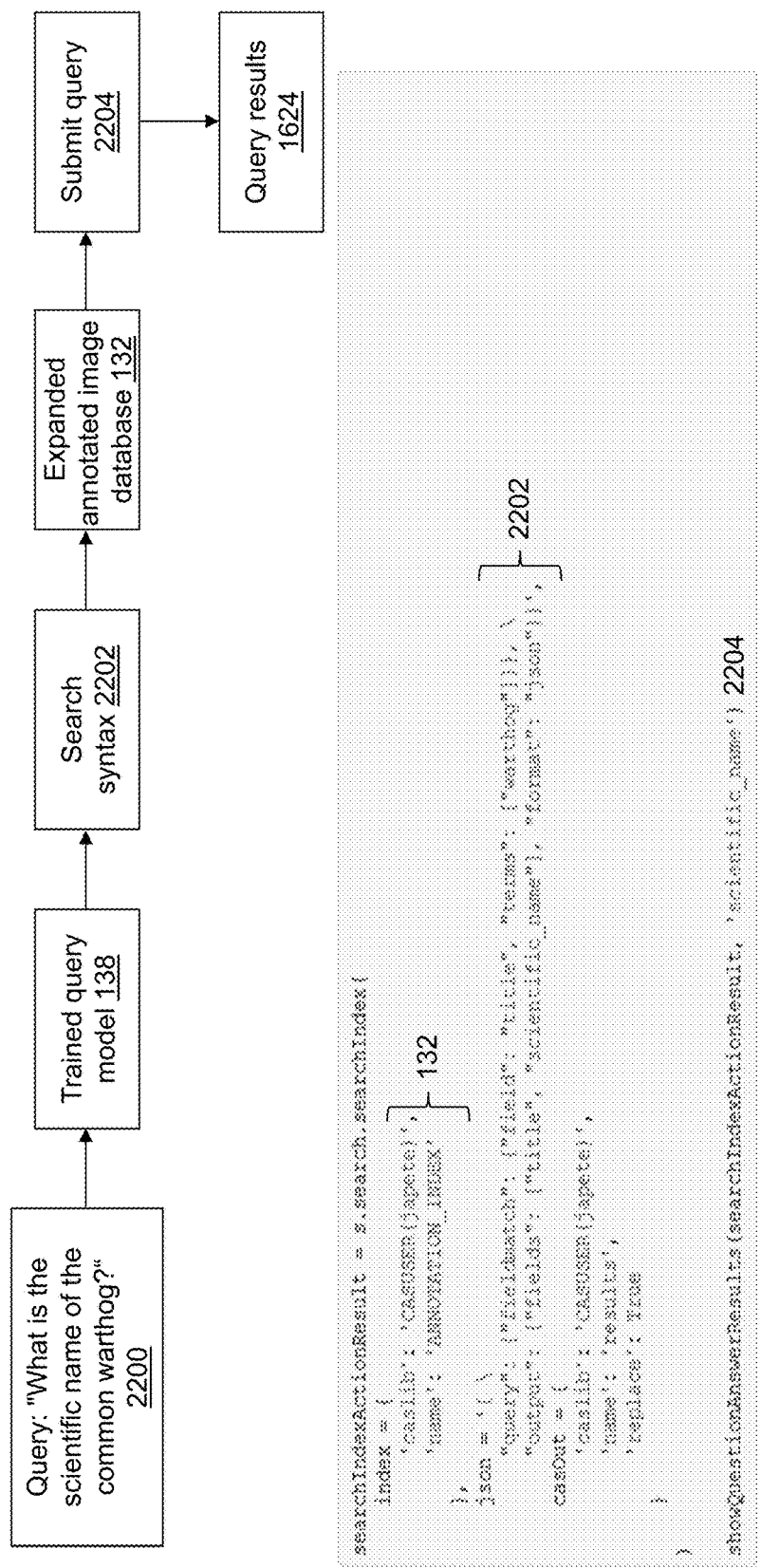
FIG. 22 depicts a block diagram of a fifth query resolution by the query processing system of FIG. 13 in accordance with an illustrative embodiment.

Referring to FIG. 22, a fifth query 2200 ("What is the scientific name of the common warthog") was input to trained query model 138 to define a fifth search syntax 2202 included in a fifth database query 2204 to expanded, annotated image database 132 to generate query results 1624. Again, in the illustrative embodiment, JSON was used as the search syntax and was included in an action submitted to expanded, annotated image database 132 using search index functionality provided by SAS® Viya™. Query results 1624 included a textual response to the query without an image.

A natural language understanding engine may be embedded in search engine application 1622. The natural language sentences may be mapped into a query that covers the answer to a question. For example, 'what are the furry and red animals' may be translated into 'type:animals and coat: furry and color:red', which returns animals that are both furry and red. Similarly 'what is the scientific name of a warthog' may be translated into 'annotation: warthog return: scientific_name' returning "*Phacochoerus africanus.*"

A similar approach for summarization may be used in a reverse direction to provide search and question answering. Rather than retrieving pieces of information for a query or a question, pieces of information are joined to generate summaries. For example, when a fox and a rabbit are identified in the same image, the association extracted for fox indicates there is a high probability that the fox is hunting the rabbit. We can also generate sentences such as "Red foxes are not found in Iceland; therefore, this shot was not taken in Iceland".

Figure 23:
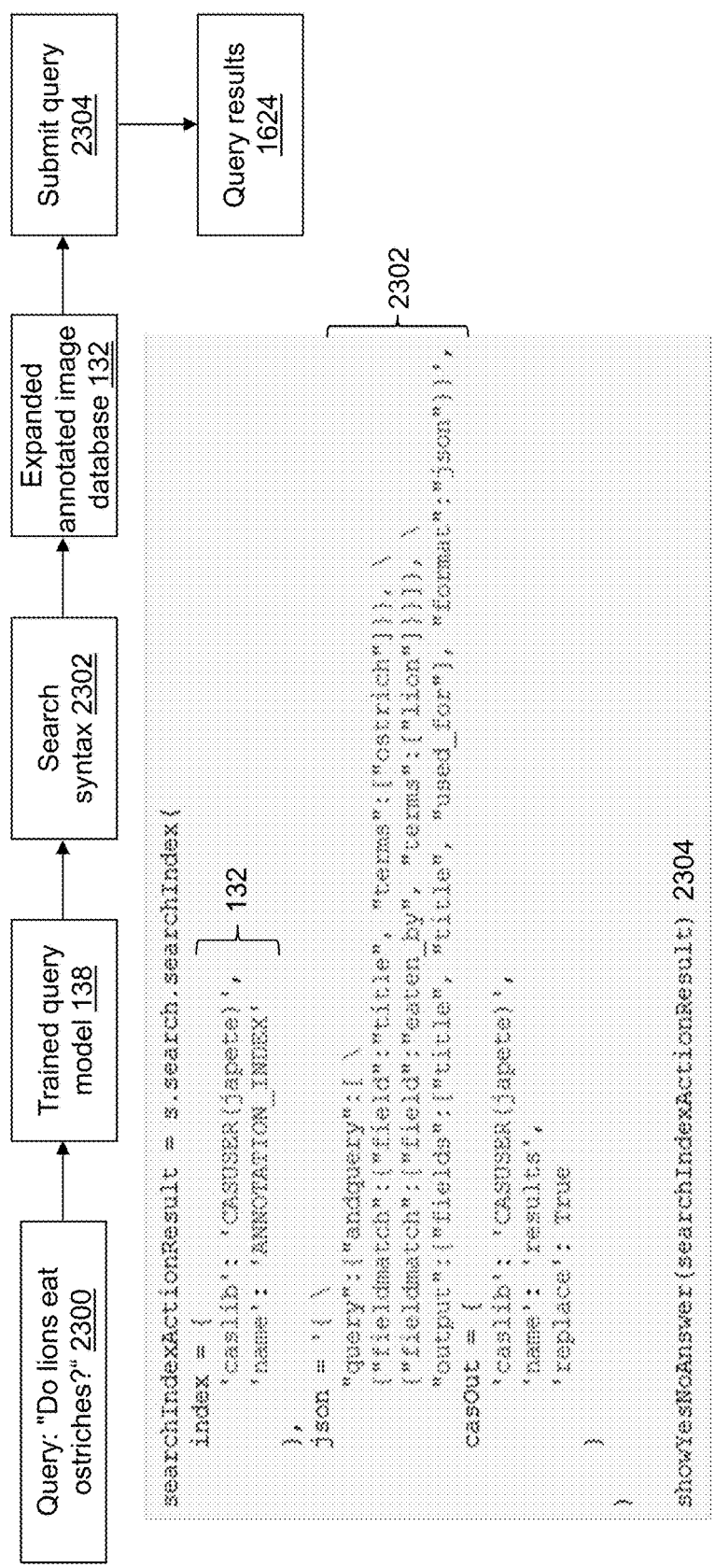
FIG. 23 depicts a block diagram of a sixth query resolution by the query processing system of FIG. 13 in accordance with an illustrative embodiment.

Referring to FIG. 23, a sixth query 2300 ("Do lions eat ostriches") was input to trained query model 138 to define a sixth search syntax 2302 included in a sixth database query 2304 to expanded, annotated image database 132 to generate query results 1624. Again, in the illustrative embodiment, JSON was used as the search syntax and was included in an action submitted to expanded, annotated image database 132 using search index functionality provided by SAS® Viya™. Query results 1624 included a textual response to the query without an image.

Figure 24:
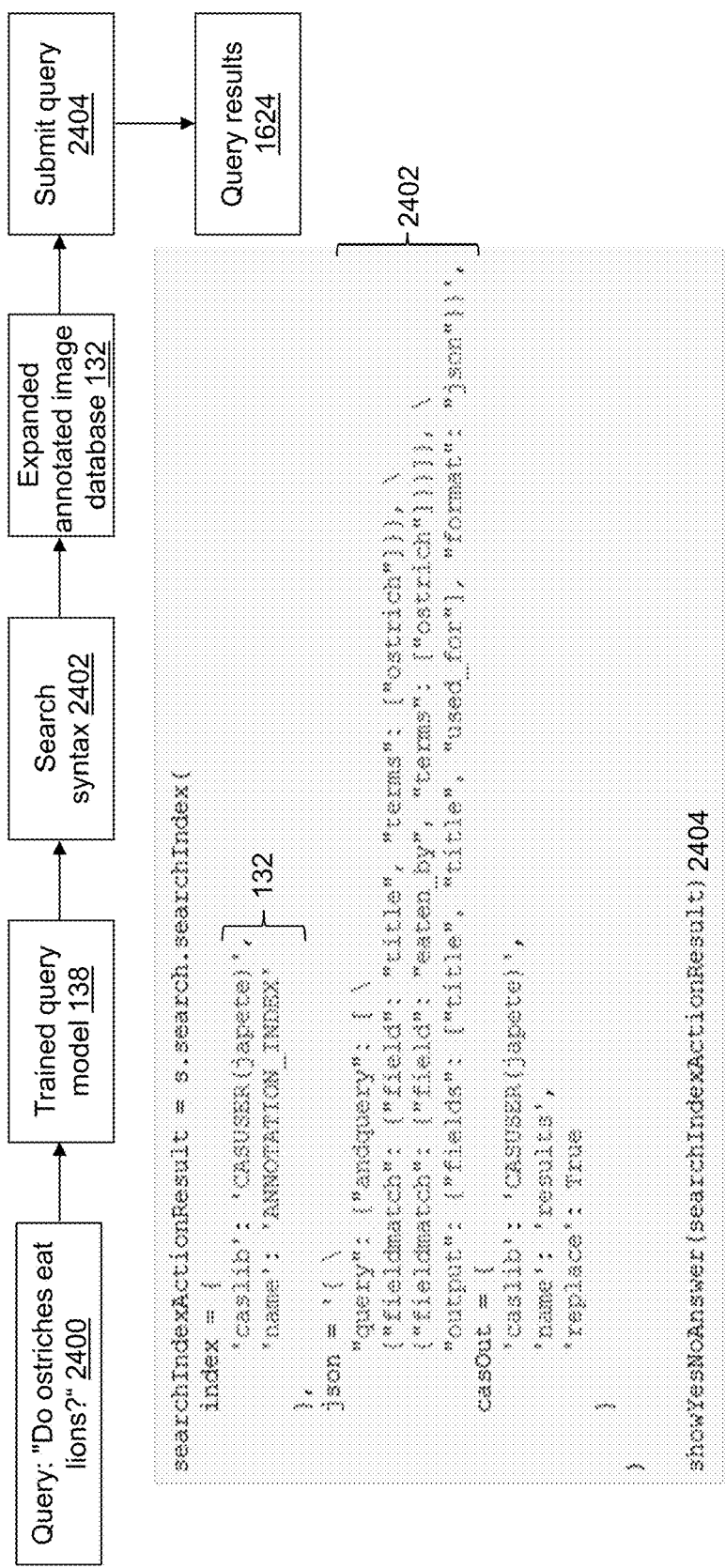
FIG. 24 depicts a block diagram of a seventh query resolution by the query processing system of FIG. 13 in accordance with an illustrative embodiment.

Referring to FIG. 24, a seventh query 2400 ("Do ostriches eat lions") was input to trained query model 138 to define a seventh search syntax 2402 included in a seventh database query 2404 to expanded, annotated image database 132 to generate query results 1624. Again, in the illustrative embodiment, JSON was used as the search syntax and was included in an action submitted to expanded, annotated image database 132 using search index functionality provided by SAS® Viya™. Query results 1624 included a textual response to the query without an image.

Without use of expanded, annotated image database 132, query results 1624 cannot evaluate the relationships between concepts that allow a response to queries such as those illustrated in FIGS. 18 to 20. As a result, irrelevant results are returned to the user that are not a proper response to the query. Existing search engines do not include the attributes and associations included in expanded, annotated image database 132 that provide relevant query results 1624. Because query results 1624 are much more relevant, computing time and communication time as well as user time is not wasted with irrelevant results. The described system can be used to support computer vision.

Using only annotated image database 126 limits the coverage of a retrieval, whereas including associations and attributes enables expansion of the search beyond the annotations. For example, 'zebra' is an annotation for FIG. 5. If only annotations are used, the knowledge about this image is limited to knowing that a 'zebra' is in the image. However, by using associations and attributes, the knowledge about the image is expanded beyond the annotations. For example, it is also then known that 'zebras have white underbellies', 'zebras have stripes' (these are examples of attributes), 'African wild dog, human, lion, and hyena are examples of their predators', and 'they exist in Africa, Botswana, East Africa, Ethiopia, Kenya, Namibia, South Africa, South-west Africa, and Tanzania' (these are examples of associations). With this extended knowledge, the described system provides a vastly larger coverage for queries.

Furthermore, answering questions about a 'zebra' is now easier because there is more information about zebras. Expanding annotations blindly using pseudo-relevance techniques or web-crawling does not provide the same level of detail about a concept. Therefore, the automatic attribute and association extractor is trained on a manually extracted list of attributes and associations so that it will extract human-level details from an information source.

Implementing some examples of the present disclosure at least in part by using the above-described machine-learning models can reduce the total number of processing iterations, time, memory, electrical power, or any combination of these consumed by a computing device when analyzing data. Some machine-learning approaches may be more efficiently and speedily executed and processed with machine-learning specific processors (e.g., not a generic CPU). For example, some of these processors can include a graphical processing unit, an application-specific integrated circuit, a field-programmable gate array, a Tensor Processing Unit by Google, an Artificial Intelligence accelerator design, and/or some other machine-learning-specific processor that implements one or more neural networks using semiconductor (e.g., silicon, gallium arsenide) devices.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:
   receive a query, wherein the query is a request to identify an image relevant to the query, wherein the query includes a concept identifier and an attribute or an association;
   input the received query into a trained query model to define a search syntax for the received query;
   submit the defined search syntax to an expanded annotated image database, wherein the expanded annotated image database is an annotated image database combined with an attribute and association database, wherein the expanded annotated image database includes a concept image of a concept identified by the concept identifier with a plurality of attributes associated with the concept and a plurality of associations associated with the concept, wherein the attribute and association database includes a plurality of data records, wherein each data record of the plurality of data records includes a concept name, the plurality of attributes associated with the concept name, and the plurality of associations associated with the concept name, wherein an attribute describes a characteristic of the concept, wherein an association describes a relationship between two concepts;
   receive a query result of the received query based on matching the defined search syntax to one or more of the plurality of attributes or one or more of the plurality of associations, wherein the query result includes the concept image of the concept associated with the matched one or more of the plurality of attributes or one or more of the plurality of associations; and
   present the concept image included in the received query result in a display.

2. The non-transitory computer-readable medium of claim 1, wherein the trained query model is a trained recurrent neural network model.

3. The non-transitory computer-readable medium of claim 2, wherein the recurrent neural network model is trained with a plurality of queries and a plurality of search syntax examples.

4. The non-transitory computer-readable medium of claim 3, wherein the plurality of search syntax examples provide a vocabulary for the concept.

5. The non-transitory computer-readable medium of claim 1, further comprising computer-readable instructions that when executed by the computing device cause the computing device to, before receiving the query:
   (a) select a first image from a plurality of images;
   (b) split the selected first image into a plurality of images;
   (c) input the selected first image and the plurality of images into an image annotation model to define a result set for each of the selected first image and the plurality of images, where each result set includes a plurality of result pairs, wherein each result pair of the plurality of result pairs includes a probability value and an image label;
   (d) apply maximum pooling to the defined result set for each of the selected first image and the plurality of images to define a single result set;
   (e) sort the plurality of result pairs of the defined single result set based on the probability value;
   (f) filter the sorted plurality of result pairs of the defined single result set based on the probability value;
   (g) output the filtered result pairs of the defined single result set to the annotated image database with an indicator of the selected first image; and
   repeat (a) to (g) for each image of the plurality of images.

6. The non-transitory computer-readable medium of claim 5, wherein filtering the sorted plurality of result pairs comprises:
   identifying a first weak result pair when a difference between a probability value of the first weak result pair and a previous probability value of a previous result pair exceeds the probability value of the first weak result pair, wherein the previous result pair is immediately prior to the first weak result pair of the sorted plurality of result pairs; and
   removing the first weak result pair and all subsequent result pairs relative to the first weak result pair from the sorted plurality of result pairs.

7. The non-transitory computer-readable medium of claim 1, wherein the annotated image database is combined with the attribute and association database using a pattern match between the concept name and the image label.

8. The non-transitory computer-readable medium of claim 5, wherein the image annotation model is a trained convolutional neural network model.

9. The non-transitory computer-readable medium of claim 1, wherein the expanded annotated image database is created by:
training a bidirectional, text recurrent neural network with a training set of word vectors to define a sentence vector;
inputting the defined sentence vector, a concept vector, and an attribute vector into a trained fully connected neural network that determines if a new attribute or a new association is valid; and
when the new attribute or the new association is valid, the new attribute or the new association is added to the attribute and association database.

10. The non-transitory computer-readable medium of claim 9, wherein the training set of word vectors are defined by a user.

11. The non-transitory computer-readable medium of claim 5, wherein the probability value indicates a likelihood that the concept identified by the image label is included in a respective image of the selected first image and the plurality of images.

12. A computing device comprising:
a processor; and
a non-transitory computer-readable medium operably coupled to the processor, the computer-readable medium having computer-readable instructions stored thereon that, when executed by the processor, cause the computing device to
receive a query, wherein the query is a request to identify an image relevant to the query, wherein the query includes a concept identifier and an attribute or an association;
input the received query into a trained query model to define a search syntax for the received query;
submit the defined search syntax to an expanded annotated image database, wherein the expanded annotated image database is an annotated image database combined with an attribute and association database, wherein the expanded annotated image database includes a concept image of a concept identified by the concept identifier with a plurality of attributes associated with the concept and a plurality of associations associated with the concept, wherein the attribute and association database includes a plurality of data records, wherein each data record of the plurality of data records includes a concept name, the plurality of attributes associated with the concept name, and the plurality of associations associated with the concept name, wherein an attribute describes a characteristic of the concept, wherein an association describes a relationship between two concepts;
receive a query result of the received query based on matching the defined search syntax to one or more of the plurality of attributes or one or more of the plurality of associations, wherein the query result includes the concept image of the concept associated with the matched one or more of the plurality of attributes or one or more of the plurality of associations; and
present the concept image included in the received query result in a display.

13. The computing device of claim 12, wherein the trained query model is a trained recurrent neural network model.

14. The computing device of claim 12, further comprising computer-readable instructions that when executed by the computing device cause the computing device to, before receiving the query:
(a) select a first image from a plurality of images;
(b) split the selected first image into a plurality of images;
(c) input the selected first image and the plurality of images into an image annotation model to define a result set for each of the selected first image and the plurality of images, where each result set includes a plurality of result pairs, wherein each result pair of the plurality of result pairs includes a probability value and an image label;
(d) apply maximum pooling to the defined result set for each of the selected first image and the plurality of images to define a single result set;
(e) sort the plurality of result pairs of the defined single result set based on the probability value;
(f) filter the sorted plurality of result pairs of the defined single result set based on the probability value;
(g) output the filtered result pairs of the defined single result set to the annotated image database with an indicator of the selected first image; and
repeat (a) to (g) for each image of the plurality of images.

15. The computing device of claim 14, wherein filtering the sorted plurality of result pairs comprises:
identifying a first weak result pair when a difference between a probability value of the first weak result pair and a previous probability value of a previous result pair exceeds the probability value of the first weak result pair, wherein the previous result pair is immediately prior to the first weak result pair of the sorted plurality of result pairs; and
removing the first weak result pair and all subsequent result pairs relative to the first weak result pair from the sorted plurality of result pairs.

16. The computing device of claim 12, wherein the annotated image database is combined with the attribute and association database using a pattern match between the concept name and the image label.

17. The computing device of claim 12, wherein the expanded annotated image database is created by:
training a bidirectional, text recurrent neural network with a training set of word vectors to define a sentence vector;
inputting the defined sentence vector, a concept vector, and an attribute vector into a trained fully connected neural network that determines if a new attribute or a new association is valid; and
when the new attribute or the new association is valid, the new attribute or the new association is added to the attribute and association database.

18. The computing device of claim 13, wherein the recurrent neural network model is trained with a plurality of queries and a plurality of search syntax examples.

19. The computing device of claim 14, wherein the image annotation model is a trained convolutional neural network model.

20. A method of identifying image search results based on a query that includes an attribute or an association, the method comprising:
receiving a query by a computing device, wherein the query is a request to identify an image relevant to the query, wherein the query includes a concept identifier and an attribute or an association;

inputting, by the computing device, the received query into a trained query model to define a search syntax for the received query;

submitting, by the computing device, the defined search syntax to an expanded annotated image database, wherein the expanded annotated image database is an annotated image database combined with an attribute and association database, wherein the expanded annotated image database includes a concept image of a concept identified by the concept identifier with a plurality of attributes associated with the concept and a plurality of associations associated with the concept, wherein the attribute and association database includes a plurality of data records, wherein each data record of the plurality of data records includes a concept name, the plurality of attributes associated with the concept name, and the plurality of associations associated with the concept name, wherein an attribute describes a characteristic of the concept, wherein an association describes a relationship between two concepts;

receiving, by the computing device, a query result of the received query based on matching the defined search syntax to one or more of the plurality of attributes or one or more of the plurality of associations, wherein the query result includes the concept image of the concept associated with the matched one or more of the plurality of attributes or one or more of the plurality of associations; and presenting, by the computing device, the concept image included in the received query result in a display.

21. The method of claim 20, wherein the trained query model is a trained recurrent neural network model.

22. The method of claim 21, wherein the recurrent neural network model is trained with a plurality of queries and a plurality of search syntax examples.

23. The method of claim 22, wherein the plurality of search syntax examples provide a vocabulary for the concept.

24. The method of claim 20, further comprising, before receiving the query:

(a) selecting, by the computing device, a first image from a plurality of images;

(b) splitting, by the computing device, the selected first image into a plurality of images;

(c) inputting, by the computing device, the selected first image and the plurality of images into an image annotation model to define a result set for each of the selected first image and the plurality of images, where each result set includes a plurality of result pairs, wherein each result pair of the plurality of result pairs includes a probability value and an image label;

(d) applying, by the computing device, maximum pooling to the defined result set for each of the selected first image and the plurality of images to define a single result set;

(e) sorting, by the computing device, the plurality of result pairs of the defined single result set based on the probability value;

(f) filtering, by the computing device, the sorted plurality of result pairs of the defined single result set based on the probability value;

(g) outputting, by the computing device, the filtered result pairs of the defined single result set to the annotated image database with an indicator of the selected first image; and repeating, by the computing device, (a) to (g) for each image of the plurality of images.

25. The method of claim 24, wherein filtering the sorted plurality of result pairs comprises:

identifying a first weak result pair when a difference between a probability value of the first weak result pair and a previous probability value of a previous result pair exceeds the probability value of the first weak result pair, wherein the previous result pair is immediately prior to the first weak result pair of the sorted plurality of result pairs; and removing the first weak result pair and all subsequent result pairs relative to the first weak result pair from the sorted plurality of result pairs.

26. The method of claim 20, wherein the annotated image database is combined with the attribute and association database using a pattern match between the concept name and the image label.

27. The method of claim 24, wherein the image annotation model is a trained convolutional neural network model.

28. The method of claim 20, wherein the expanded annotated image database is created by:

training a bidirectional, text recurrent neural network with a training set of word vectors to define a sentence vector;

inputting the defined sentence vector, a concept vector, and an attribute vector into a trained fully connected neural network that determines if a new attribute or a new association is valid; and when the new attribute or the new association is valid, the new attribute or the new association is added to the attribute and association database.

29. The method of claim 28, wherein the training set of word vectors are defined by a user.

30. The method of claim 24, wherein the probability value indicates a likelihood that the concept identified by the image label is included in a respective image of the selected first image and the plurality of images.

* * * * *

UNITED STATES PATENT AND TRADEMARK OFFICE
CERTIFICATE OF CORRECTION

PATENT NO. : 10,191,921 B1
APPLICATION NO. : 15/944163
DATED : January 29, 2019
INVENTOR(S) : Ethem F. Can et al.

Page 1 of 1

It is certified that error appears in the above-identified patent and that said Letters Patent is hereby corrected as shown below:

In the Specification

Column 8, Line 49:
Delete the phrase "is tar" and replace with --is 'car'--.

Column 8, Line 50:
Delete the phrase "between tar" and replace with --between 'car'--.

Column 8, Line 51:
Delete the phrase "of tar" and replace with --of 'car'--.

Signed and Sealed this
Twenty-third Day of April, 2019

Andrei Iancu
*Director of the United States Patent and Trademark Office*